(12) United States Patent
Strubbe et al.

(10) Patent No.: US 7,364,068 B1
(45) Date of Patent: *Apr. 29, 2008

(54) METHODS AND APPARATUS FOR INTELLIGENT SELECTION OF GOODS AND SERVICES OFFERED TO CONFEREES

(75) Inventors: Todd B. Strubbe, Omaha, NE (US); Rocco L. Adornato, Omaha, NE (US)

(73) Assignee: West Corporation, Omaha, NE (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/018,395

(22) Filed: Dec. 21, 2004

Related U.S. Application Data

(63) Continuation-in-part of application No. 10/335,060, filed on Dec. 31, 2002, which is a continuation-in-part of application No. 09/907,724, filed on Jul. 17, 2001, which is a continuation-in-part of application No. 09/691,392, filed on Oct. 17, 2000, which is a continuation-in-part of application No. 09/505,619, filed on Feb. 16, 2000, now Pat. No. 7,280,979, which is a continuation of application No. 09/038,399, filed on Mar. 11, 1998, now Pat. No. 6,055,513.

(51) Int. Cl.
*G06F 17/00* (2006.01)
(52) U.S. Cl. .................. 235/376; 705/26; 705/27; 705/10; 705/14
(58) Field of Classification Search ............... 235/376, 235/378, 380; 705/26, 27, 10, 14, 1
See application file for complete search history.

(56) References Cited

U.S. PATENT DOCUMENTS 4,792,968 A    12/1988   Katz (Continued)

FOREIGN PATENT DOCUMENTS

CA    2222229    1/1997

(Continued)

OTHER PUBLICATIONS

Levine, Kay. Anchorage Daily News. Troubleshooter; [Final Edition 30]. Anchorage, Alaska. Jul. 16, 1991. p. B.2.
Geller, Lois. Direct Marketing. "10 ways to joggle you out of your direct marketing doldrums". Graden City. Feb. 1998. vol. 60, Iss. 10. p. 18, 4 pgs.

(Continued)

*Primary Examiner*—Uyen-Chau N Le

(57) ABSTRACT

Computer-based methods, computer readable media, and computer program products for offering upsell items to conferees accessing a conferencing platform utilizing, for example, an electronic communications device. Various aspects of the methods can include conducting one or more conferee-initiated primary transactions related to accessing the conferencing platform. The method then obtains data relating to the primary transaction, which data can include data representing the identity of the conferee and the subject matter of the primary transaction. The method then selects the upsell item as a result of or in response to the conferee-initiated primary transaction by, first, utilizing the data representing the identity of the conferee to obtain at least a second data element relating to the conferee. The method then utilizes, at least in part, the primary transaction data, including the identity of the subject matter of the primary transaction, along with the second data element, to determine the upsell item for offer to the conferee. Finally, the upsell item is offered to the conferee in real time with the primary transaction.

3 Claims, 16 Drawing Sheets

U.S. PATENT DOCUMENTS

| | | |
|---|---|---|
| 4,799,156 A | 1/1989 | Shavit |
| 4,812,628 A | 3/1989 | Boston |
| 4,825,045 A | 4/1989 | Humble |
| 4,833,308 A | 5/1989 | Humble |
| 4,845,658 A | 7/1989 | Gifford |
| 4,845,739 A | 7/1989 | Katz |
| 4,870,579 A | 9/1989 | Hey |
| 4,908,761 A | 3/1990 | Tai |
| 4,910,672 A | 3/1990 | Off |
| 4,947,028 A | 8/1990 | Gorog |
| 4,967,366 A | 10/1990 | Kaehler |
| 4,992,940 A | 2/1991 | Dworkin |
| 4,996,642 A | 2/1991 | Hey |
| 5,010,485 A | 4/1991 | Bigari |
| 5,053,957 A | 10/1991 | Suzuki |
| 5,056,019 A | 10/1991 | Schultz |
| 5,173,851 A | 12/1992 | Off |
| 5,201,010 A | 4/1993 | Deaton |
| 5,209,665 A | 5/1993 | Billings |
| 5,231,571 A | 7/1993 | D'Agostino |
| 5,235,509 A | 8/1993 | Mueller |
| 5,237,620 A | 8/1993 | Deaton |
| 5,270,920 A | 12/1993 | Pearse |
| 5,293,615 A | 3/1994 | Amado |
| 5,295,064 A | 3/1994 | Malec |
| 5,305,196 A | 4/1994 | Deaton |
| 5,319,542 A | 6/1994 | King, Jr. |
| 5,327,508 A | 7/1994 | Deaton |
| 5,353,218 A | 10/1994 | Delapa |
| 5,353,219 A | 10/1994 | Mueller |
| 5,388,165 A | 2/1995 | Deaton |
| 5,412,708 A | 5/1995 | Katz |
| 5,430,644 A | 7/1995 | Deaton |
| 5,442,771 A | 8/1995 | Filepp et al. |
| 5,446,891 A | 8/1995 | Kaplan et al. |
| 5,448,471 A | 9/1995 | Deaton |
| 5,459,306 A | 10/1995 | Stein |
| 5,481,094 A | 1/1996 | Suda |
| 5,481,294 A | 1/1996 | Thomas |
| 5,490,060 A | 2/1996 | Malec |
| 5,495,284 A | 2/1996 | Katz |
| 5,500,681 A | 3/1996 | Jones |
| 5,502,368 A | 3/1996 | Syverson |
| 5,502,636 A | 3/1996 | Clarke |
| 5,504,675 A | 4/1996 | Cragun |
| 5,532,735 A | 7/1996 | Blahut et al. |
| 5,535,130 A | 7/1996 | Long |
| 5,537,590 A | 7/1996 | Amado |
| 5,566,353 A | 10/1996 | Cho |
| 5,576,951 A | 11/1996 | Lockwood |
| 5,583,763 A | 12/1996 | Atcheson |
| 5,592,378 A | 1/1997 | Cameron et al. |
| 5,592,560 A | 1/1997 | Deaton |
| 5,612,868 A | 3/1997 | Off |
| 5,615,342 A | 3/1997 | Johnson |
| 5,621,812 A | 4/1997 | Deaton |
| 5,625,776 A | 4/1997 | Johnson |
| 5,630,068 A | 5/1997 | Vela |
| 5,636,346 A | 6/1997 | Saxe |
| 5,638,457 A | 6/1997 | Deaton |
| 5,642,485 A | 6/1997 | Deaton |
| 5,644,723 A | 7/1997 | Deaton |
| 5,649,114 A | 7/1997 | Deaton |
| 5,659,469 A | 8/1997 | Deaton |
| 5,675,662 A | 10/1997 | Deaton |
| 5,679,940 A | 10/1997 | Templeton |
| 5,687,322 A | 11/1997 | Deaton |
| 5,689,553 A | 11/1997 | Ahuja |
| 5,701,400 A | 12/1997 | Amado |
| 5,710,887 A | 1/1998 | Chelliah |
| 5,715,399 A | 2/1998 | Bezos |
| 5,721,832 A | 2/1998 | Westrope |
| 5,727,163 A | 3/1998 | Bezos |
| 5,732,398 A | 3/1998 | Tagawa |
| 5,732,400 A | 3/1998 | Mandler |
| 5,740,035 A | 4/1998 | Cohen |
| 5,740,252 A | 4/1998 | Minor |
| 5,740,549 A | 4/1998 | Reilly |
| 5,742,929 A | 4/1998 | Kallman |
| 5,745,681 A | 4/1998 | Levine |
| 5,748,907 A | 5/1998 | Crane |
| 5,748,908 A | 5/1998 | Yu |
| 5,749,081 A | 5/1998 | Whiteis |
| 5,754,938 A | 5/1998 | Herz et al. |
| 5,758,257 A | 5/1998 | Herz et al. |
| 5,758,328 A | 5/1998 | Giovannoli |
| 5,761,601 A | 6/1998 | Nemirofsky |
| 5,774,670 A | 6/1998 | Montulli |
| 5,790,793 A | 8/1998 | Higley |
| 5,790,935 A | 8/1998 | Payton |
| 5,794,207 A | 8/1998 | Walker |
| 5,794,209 A | 8/1998 | Agrawal |
| 5,796,967 A | 8/1998 | Filepp et al. |
| 5,821,513 A | 10/1998 | O'Hagan |
| 5,826,240 A | 10/1998 | Brockman |
| 5,838,314 A | 11/1998 | Neel |
| 5,842,199 A | 11/1998 | Miller |
| 5,845,263 A | 12/1998 | Camaisa |
| 5,848,396 A | 12/1998 | Gerace |
| 5,855,008 A | 12/1998 | Goldhaber |
| 5,857,175 A | 1/1999 | Day |
| 5,870,721 A | 2/1999 | Norris |
| 5,870,724 A | 2/1999 | Lawlor |
| 5,878,401 A | 3/1999 | Joseph |
| 5,878,403 A | 3/1999 | DeFrancesco |
| 5,890,137 A | 3/1999 | Koreeda |
| 5,893,075 A | 4/1999 | Plainfield |
| 5,905,973 A | 5/1999 | Yonezawa |
| 5,905,974 A | 5/1999 | Fraser |
| 5,909,492 A | 6/1999 | Payne |
| 5,914,472 A | 6/1999 | Foladare |
| 5,915,243 A | 6/1999 | Smolen |
| 5,918,213 A | 6/1999 | Bernard |
| 5,926,796 A | 7/1999 | Walker |
| 5,933,811 A | 8/1999 | Angles et al. |
| 5,937,390 A | 8/1999 | Hyodo |
| 5,940,495 A | 8/1999 | Bondarenko |
| 5,940,809 A | 8/1999 | Musmanno |
| 5,948,061 A | 9/1999 | Merriman |
| 5,970,473 A | 10/1999 | Gerszberg |
| 5,983,069 A | 11/1999 | Cho |
| 5,999,914 A | 12/1999 | Blinn |
| 6,014,634 A | 1/2000 | Scroggie |
| 6,018,578 A | 1/2000 | Bondarenko |
| 6,018,715 A | 1/2000 | Lynch |
| 6,020,883 A | 2/2000 | Herz |
| 6,026,370 A | 2/2000 | Jermyn |
| 6,029,141 A | 2/2000 | Bezos |
| 6,029,149 A | 2/2000 | Dykstra |
| 9,505,619 | 2/2000 | Katz |
| 6,035,288 A | 3/2000 | Solomon |
| 6,055,513 A | 4/2000 | Katz |
| 6,064,980 A | 5/2000 | Jacobi |
| 6,064,987 A | 5/2000 | Walker |
| 6,075,551 A | 6/2000 | Berezowski |
| 6,078,896 A | 6/2000 | Kaehler |
| 6,081,788 A | 6/2000 | Appleman |
| 6,085,164 A | 7/2000 | Smith |
| 6,086,477 A | 7/2000 | Walker |
| 6,088,686 A | 7/2000 | Walker |
| 6,088,722 A | 7/2000 | Herz |
| 6,108,493 A | 8/2000 | Miller |
| 6,112,186 A | 8/2000 | Bergh |
| 6,119,099 A | 9/2000 | Walker |

| | | |
|---|---|---|
| 6,125,356 A | 9/2000 | Brockman |
| 6,128,663 A | 10/2000 | Thomas |
| 6,134,309 A | 10/2000 | Carson |
| 6,134,532 A | 10/2000 | Lazarus |
| 6,135,349 A | 10/2000 | Zirkel |
| 6,138,911 A | 10/2000 | Fredregill |
| 6,144,944 A | 11/2000 | Kurtzman |
| 6,161,103 A | 12/2000 | Rauer |
| 6,167,383 A | 12/2000 | Henson |
| 6,169,542 B1 | 1/2001 | Hooks |
| 6,169,985 B1 | 1/2001 | Almgren |
| 6,185,558 B1 | 2/2001 | Bowman |
| 6,196,458 B1 | 3/2001 | Walker |
| 6,198,739 B1 | 3/2001 | Neyman |
| 6,199,762 B1 | 3/2001 | Hohle |
| 6,202,334 B1 | 3/2001 | Reynolds |
| 6,223,163 B1 | 4/2001 | Van Luchene |
| 6,226,624 B1 | 5/2001 | Watson |
| 6,236,978 B1 | 5/2001 | Tuzhilin |
| 6,248,946 B1 | 6/2001 | Dwek |
| 6,256,614 B1 | 7/2001 | Wecker |
| 6,266,649 B1 | 7/2001 | Linden |
| 6,266,668 B1 | 7/2001 | Vanderveldt |
| 6,298,331 B1 | 10/2001 | Walker |
| 6,298,348 B1 | 10/2001 | Eldering |
| 6,314,089 B1 | 11/2001 | Szlam |
| 6,317,718 B1 | 11/2001 | Fano |
| 6,317,722 B1 | 11/2001 | Jacobi |
| 6,317,723 B1 | 11/2001 | Walker |
| 6,321,221 B1 | 11/2001 | Bieganski |
| 6,330,548 B1 | 12/2001 | Walker |
| 6,332,126 B1 | 12/2001 | Peirce |
| 6,334,112 B1 | 12/2001 | Walker |
| 6,334,113 B1 | 12/2001 | Walker |
| 6,334,127 B1 | 12/2001 | Bieganski |
| 6,336,104 B1 | 1/2002 | Walker |
| 6,337,904 B1 | 1/2002 | Gisby |
| 6,351,736 B1 | 2/2002 | Weisberg |
| 6,353,390 B1 | 3/2002 | Beri |
| 6,369,840 B1 | 4/2002 | Barnett |
| 6,381,583 B1 | 4/2002 | Kenney |
| 6,389,337 B1 | 5/2002 | Kolls |
| 6,397,057 B1 | 5/2002 | Malackowski |
| 6,397,193 B1 | 5/2002 | Walker |
| 6,405,174 B1 | 6/2002 | Walker |
| 6,424,706 B1 | 7/2002 | Katz |
| 6,424,949 B1 | 7/2002 | Deaton |
| 6,434,231 B2 | 8/2002 | Neyman |
| 6,434,532 B2 | 8/2002 | Goldband |
| 6,501,832 B1 | 12/2002 | Saylor |
| 6,546,193 B1 | 4/2003 | Um |
| 6,553,178 B2 | 4/2003 | Abecassis |
| 6,567,787 B1 | 5/2003 | Walker |
| 6,571,279 B1 | 5/2003 | Herz |
| 6,574,614 B1 | 6/2003 | Kesel |
| 6,598,024 B1 | 7/2003 | Walker |
| 6,598,026 B1 | 7/2003 | Herz |
| 6,665,837 B1 | 12/2003 | Dean |
| 6,671,879 B1 | 12/2003 | Schlarb |
| 6,694,300 B1 | 2/2004 | Walker |
| 6,698,020 B1 | 2/2004 | Zigmond |
| 6,701,317 B1 | 3/2004 | Wiener |
| 6,704,727 B1 | 3/2004 | Kravets |
| 6,718,551 B1 | 4/2004 | Swix |
| 6,756,997 B1 | 6/2004 | Ward, III |
| 6,773,351 B2 | 8/2004 | Brown |
| 6,782,370 B1 | 8/2004 | Stack |
| 6,823,319 B1 | 11/2004 | Lynch |
| 6,954,732 B1 | 10/2005 | DeLapa et al. |
| 7,072,849 B1 | 7/2006 | Filepp et al. |
| 2001/0014868 A1 | 8/2001 | Herz |
| 2001/0032137 A1 | 10/2001 | Bennett |
| 2001/0037288 A1 | 11/2001 | Bennett |
| 2001/0039516 A1 | 11/2001 | Bennett |
| 2001/0047307 A1 | 11/2001 | Bennett |
| 2002/0012428 A1 | 1/2002 | Neyman |
| 2002/0023272 A1 | 2/2002 | Pocock |
| 2002/0026394 A1 | 2/2002 | Savage |
| 2002/0026496 A1 | 2/2002 | Boyer |
| 2002/0046124 A1 | 4/2002 | Alderucci |
| 2002/0077960 A1 | 6/2002 | Kiely |
| 2002/0091632 A1 | 7/2002 | Turock |
| 2002/0111867 A1 | 8/2002 | Walker |
| 2002/0116260 A1 | 8/2002 | Szabo |
| 2002/0116282 A1 | 8/2002 | Martin |
| 2002/0120519 A1 | 8/2002 | Martin |
| 2002/0188511 A1 | 12/2002 | Johnson |
| 2003/0172000 A1 | 9/2003 | Foster |
| 2003/0196204 A1 | 10/2003 | Thiagarajan |
| 2003/0229897 A1 | 12/2003 | Frisco |
| 2004/0019900 A1 | 1/2004 | Knightbridge |
| 2004/0143838 A1 | 7/2004 | Rose |
| 2005/0132404 A1 | 6/2005 | Clapp |

FOREIGN PATENT DOCUMENTS

| | | |
|---|---|---|
| EP | 0265083 | 4/1988 |
| EP | 0751471 | 1/1997 |
| EP | 0827063 | 3/1998 |
| GB | 2336925 | 11/1999 |
| WO | WO199421084 | 9/1994 |
| WO | WO199720279 | 6/1997 |
| WO | WO199721183 | 6/1997 |
| WO | WO199833135 | 7/1998 |
| WO | WO199834189 | 8/1998 |
| WO | WO199840832 | 9/1998 |
| WO | WO199843149 | 10/1998 |
| WO | WO199844699 | 10/1998 |
| WO | WO199853406 | 11/1998 |
| WO | WO199858334 | 12/1998 |
| WO | WO199906914 | 2/1999 |
| WO | WO199910794 | 3/1999 |
| WO | WO199911006 | 3/1999 |
| WO | WO199911007 | 3/1999 |
| WO | WO199913424 | 3/1999 |
| WO | WO199919809 | 4/1999 |
| WO | WO199946706 | 9/1999 |
| WO | WO199966438 | 12/1999 |
| WO | WO200000916 | 1/2000 |
| WO | WO200010069 | 2/2000 |
| WO | WO200021005 | 4/2000 |
| WO | WO200033222 | 6/2000 |
| WO | WO200034910 | 6/2000 |
| WO | WO200038122 | 6/2000 |
| WO | WO200046720 | 8/2000 |
| WO | WO200051050 | 8/2000 |
| WO | WO200124032 | 4/2001 |
| WO | WO200137183 | 5/2001 |
| WO | WO200137193 | 5/2001 |
| WO | WO200171683 | 9/2001 |
| WO | WO200193119 | 12/2001 |
| WO | WO200205122 | 1/2002 |
| WO | WO200208997 | 1/2002 |
| WO | WO200219203 | 3/2002 |
| WO | WO200225909 | 3/2002 |

OTHER PUBLICATIONS

Whelan, Carolyn. Electronic News. "DirectTV chooses ATI after AT&T deal folds". New York. Dec. 15, 1997. vol. 43, Iss. 2198. p. 44, 1 pgs.

Stern, Linda. Home Office Computing. "Save $60K this year". Boulder. Jan. 1998. vol. 16, Iss. 1. p. 58, 6 pgs.

Kislik, Elizabeth. Catalog Age. "Beyond the thought that counts". New Canaan. Jul. 1997. vol. 14, Iss. 7, p. 199, 2 pgs.

Galvin, Brian. Telemarketing & Call Center Solutions. "Focus On: The Inbound call center outlook-how emerging technologies will change your business". Norwalk. Apr. 1997. vol. 15, Iss. 10. p. 24, 5 pgs.

Reilly, Brian. Advertising Age's Business Marketing. "Upselling strategies hit the net". Chicago. Dec. 1996. vol. 81, Iss. 10. p. M1, 2 pgs.

M2 Presswire. "FIJITSU: Fijitsu introduces developer's toolkit for Edify Electronic Workforce platform". Coventry. Mar. 3, 1998. p. 1.

CNN, Software To Limit Tracking Cell Phone Users, www.cnn.com, Jan. 19, 2004.

Tedeschi, Bob, E-Commerce Report; Demand Among Marketers For Advertising Next To Search Results Could Soon Outpace Supply, The New York Times, Jul. 19, 2004.

CMF: Associated Press; "Telemarketing Firm Agrees to Alter Sales Policy," Times Union, Sep. 19, 2002, 2 pgs.

Bloomberg; "Web Sites Help Consumers Shop for Hard-to-find Credit Card Deals," Las Vegas Journal, Feb. 28, 1999, 3 pgs.

Fitzgerald, Kate; "Putting Tech Into Telemarketing," Credit Card Management, Jul. 1999, v12n4 p.34, 8 pgs.

CMF: Lumpur, Kuala; "Credit Card Ties Up With Alumni Life," Jan. 2, 1996, 2 pgs.

Meece, Mickey; "Fertile Sales Turf: Fee-Based Card Services Memberworks' Gary Johnson Counts the Way He Can Sell to Cardholders," American Banker, v162n68 p.15, 4 pgs.

Steel, James; "Combating Counterfeit Credit Cards: The Technological Challe," Credit World, May/Jun. 1995, v83n5 p.16, 3 pgs.

Throne, Adam; "Capital One's Call Center Soars to New Heights," Call Center Magazine, Mar. 2001, v14n3 p. 84, 4 pgs.

Nett, Walt, Sweet Deals Can Lull The Unaware Credit Card User, Arizona Daily Star, Jun. 19, 1994, p. 1.D.

Santi, Albert, Encyclopedia of Mortgage and Real Estate Finance, Jan. 1998, Mortgage Bankers Association of America's Real Estate Finance Press, Revised Edition, pp. 213 & 218.

Wagner; Lon, Fry Fight As Fast-Food Chains Face Off With French Fries, We Weigh The Issues For You; Virginian-Pilot, Norfolk, VA; Apr. 6, 1997 extracted on Internet from Proquest Database.

Perkins, Ed; Consumer Reports On Travel Careful Shopping Will Avoid Bait-And-Switch Promotions; The Atlanta Constitution; Atlanta, GA; Jan. 4, 1995 extracted on Internet from Proquest Database.

Able Solutions, Able Solutions Announces AbleCommerce 2.6, PR NEWSWIRE, Sep. 15, 1998.

Active Decisions, Documents from www2.activebuyersguide.com, Sep. 17, 2002.

ACTV, Inc., Documents from www.actv.com, Apr. 23, 2002.

Acxiom, Documents from www.acxiom.com, Sep. 18, 2002.

Alta Vista, Alta Vista Alters Its Vision Of The Market, Wall Street Journal, Abstract, Dec. 18, 1996.

AMAZON.COM, Website Prinout. www.amazon.com, Feb. 22, 1998.

AMAZON.COM, Website Printout, www.amazon.com, Feb. 24, 1998.

AMAZON.COM, Website Printout, www.amazon.com, Jul. 8, 1998.

Amdocs, Documents from www.amdocs.com, Sep. 18, 2002.

Angiolillo, J., Personal Visual Communications Enters The Marketpalce, AT&T Technology Products, Systems & Services, Feb. 21, 1992, pp. 18-28, Issue 7,3.

Arbor Software, www.arborsoft.com, Jun. 30, 1998.

Avery, Christopher, Recommender Systems for Evaluating Computer Messages, Communications from the ACM, Mar. 1997, pp. 88-89, vol. 40, No. 3.

Balabanovic, Marko, Fab: Content-Based, Collaborative Recommendation, Communications of the ACM, Mar. 1997, pp. 66-72, vol. 40, No. 3.

Baran, Paul, Some Changes in Information Technology Affecting Marketing in the Year 2000, Changing Marketing Systems, 1967 Winter Conference, Dec. 27-29, 1967, pp. 76-77, No. 26.

Barrios, Jennifer, Billboards That Know You, The New York Times, Dec. 14, 2003, p. 55.

Be Free, Documents from www.befree.com, Sep. 18, 2002.

Berry, Jonathan, Database Marketing: A Potent New Tool For Selling, Business Week, Sep. 5, 1994, p. 56, issue 3388.

Binkley, Christina, Soon, The Desk Clerk Will Know All About You, Wall Street Journal, May 8, 2003, p. D4.

Brier, Steven E., Smart Devices Peep Into Your Grocery Cart, New York Times, Jul. 16, 1998, section G, p. 3, col. 3.

Brittan, David, Being There-The Promise Of Multimedia Communications, Technology Review, May 6, 1992, pp. 43-50.

Bruno, Michael, MicroCreditCard To Launch Micro Payment Service, Wastech.com, Aug. 29, 2000.

Burkhead, J., Fidelity Investments Letter To Investors, Feb. 1, 1998.

Business Logic, www.blogicsys.com, Sep. 16, 2002.

Business Objects, www.businessobjects.com, Sep. 18, 2002.

CDNOW, CDNow Rated Top Music Site By eMarketer, the Authority On Business Online, PR Newswire, Sep. 3, 1998.

Cerbone, R., The Coming HDTV Wave, AT&T Technology Products, Systems & Services, Feb. 1, 1992, pp. 14-17, issue 7, 3.

Charles Schwab, Asset Allocation Toolkit, Website, Feb. 20, 1998.

Chiranky, Lisa, Web Power: Taking Call Centers To New Dimensions, Internet & Call Center Solutions, www.tmcnet.com, 1997.

CLICK2BOOST, www.click2boost.com, Sep. 17, 2002.

CONVERGYS, www.convergys.com, Oct. 8, 2002.

COSMOCOM, Computer Telephony, Jul. 1998, p. 1.

CYCORP, www.cyc.com, Sep. 18, 2002.

Delgado, Joaquin, Content-Based Collaborative Information Filtering: Actively Learning To Classify And Recommend Documents, Nagoya Institute of Technology, Abstract.

Delgado, Joaquin, Intelligent Collaborative Information Retrieval, Nagoya Institute of Technology, Abstract.

DOUBLECLICK, www.doubleclick.com, Sep. 16, 2002.

DoubleClick In Double Trouble, Yahoo News, Feb. 19, 1998.

DOUBLECLICK, DoubleClick On New Media Buying, Inside Media, Abstract, Feb. 7, 1996.

Dragan, Richard, Advice From The Web, PC Magazine, Sep. 9, 1997, p. 133(7), vol. 16, No. 15.

E.PIPHANY, www.epiphany.com, Sep. 18, 2002.

Elliott, Christopher, Hotels Get Pushy About Their Loyalty Programs, The New York Times, Jun. 1, 2004, p. C7.

Englander, A.C., Creating Tomorrow's Multimedia Systems Today, AT&T Technology Products, Feb. 1, 1992, pp. 24-30, vol. 7, No. 3.

Ensor, J. Robert, The Rapport Multimedia Conferencing System-A Software Overview, IEEE, pp. 52-58.

Faloutsos, Christos, A Survey Of Information Retrieval And Filtering Methods, University of Maryland, Abstract, pp. 1-22.

Fano, Andrew E., Shopper's Eye: Using Location-Based Filtering For A Shopping Agent In The Physical World, Second International Conference on Autonomous Agents, 1998.

Gaither, Chris, Google Designs An Engine For Eggheads, Los Angeles Times, Oct. 27, 2004.

GemStar-TV, Documents from www.gemstartvguide.com, Dec. 14, 2001.

GoldPocket, Documents from www.goldpocket.com, Sep. 17, 2002.

Green, Heather, The Information Gold Mine, Business Week e.biz.

Harvey, D.E., Videoconferencing Systems: Seeing Is Believing, AT&T Technology Products, Feb. 1, 1992, pp. 7-13, vol. 7, No. 3.

Hays, Laurie, Technology: Using Computers To Divine Who Might Buy A Gas Grill, Wall Street Journal, Aug. 16, 1994, Abstract 7.

Helman, Christopher, Now Hear This, Forbes, Sep. 15, 2003, pp. 122-124, v. 172, No. 5.

Hill, Kimberly, Autonomy Digs Into Contact-Center Market, CRMdaily.com, May 20, 2003.

iCat, iCat Electronic Commerce Suite Takes "Best of Show" Award at WebINNOVATION 97, PR Newswire, Jun. 24, 1997.

iCat, iCat's Commerce Suite Makes Setting up Shop on the 'net Even Easier Than High Street, M2 Presswire, Feb. 19, 1997.

Internet World, IBM to Expand E-Comm Features, Newsbytes News Network, Dec. 16, 1996.

Kalakota, Ravi, Electronic Commerce: A Manager's Guide, Addison-Wesley Longman, 1996.

Kautz, Henry, Referral Web: Combining Social Networks and Collaborative Filtering, Communications of the ACM, Mar. 1997, pp. 63-65, vol. 40, No. 3.

Knapp, Adam, OmniSky Israel—Tracking Urban Nomads, www.accenture.com, Apr. 8, 2003.

Kohda, Youji, Ubiquitous Advertising On The WWW: Merging Advertisement On The Browser, Proceedings of the Fifth International World Wide Web Conference (France), May 1, 1996.

Konstan, Joseph A., GroupLens: Applying Collaborative Filtering to Usenet News, Communications of the ACM, Mar. 1997, pp. 77-78, vol. 40, No. 3.

KPMG, Documents from www.kpmgconsulting.com, Sep. 18, 2002.

Kuffel, Chris, Mobile Commerce: Money Keeps Rolling In, International Herald Tribune, Oct. 13, 2003.

Maltz, David, Pointing The Way: Active Collaborative Filtering, CHI '95 Proceedings Papers, 1995.

Markoff, John, In Searching The Web, Google Finds Riches, The New York Times, Apr. 13, 2003.

McMains, Andrew, Weiss, Whitten, Stagliano's, ADWEEK Eastern Edition, p. 82, vol. 39, No. 24.

Meeks, Fleming, The Future Of The Future, Barron's, Nov. 13, 2002, pp. V5-V8.

Middleton, Timothy, IT Stars In Video Chain's Rollout, www.iweek.com, Jan. 30, 1995.

Miller, Bradley N., Experiences with GroupLens: Making Usenet Useful Again, University of Minnesota, Abstract.

MIVA, Documents from www.miva.com, Sep. 18, 2002.

Moxon, Bruce, Data Mining: The Golden Promise, www.oreview.com, 1997, pp. 1-14.

Nash, Edward L., Direct Marketing, Strategy, Planning, Execution, Third Edition McGraw-Hill, Inc., 1995, pp. 164-165, 364-367.

Net Perceptions, Inc., Building Customer Loyalty and High-Yield Relationships Through GroupLens Collaborative Filtering, White Paper, Nov. 19, 1996, pp. 1-9.

Nielsen Media Research, Who We Are And What We Do, www.nielsenmedia.com.

Paragren, Website Printout, www.paragren.com, Jun. 30, 1998.

Peppers, Don, The One To One Future Building Relationships Once Customer At A Time, Back From The Future, 1993, 1994, pp. 3-17, 40-43.

Posko, J.L., Versatile Services Streamline Global Videoconferencing, AT&T Technology Products, Feb. 1, 1992, pp. 2-8, vol. 7, No. 3.

Resnick, Paul, GroupLens: An Open Architecture for Collaborative Filtering of Netnews, Proceedings of ACM 1994 Conference on Computer Supported Cooperative Work, Abstract, pp. 175-186.

Rucker, James, Siteseer: Personalized Navigation for the Web, Communications of the ACM, Mar. 1997, pp. 73-76, vol. 40, No. 3.

SAS, www.sas.com, Sep. 16, 2002.

Shardanand, Upendra, Social Information Filtering: Algorithms for Automating "Word of Mouth", MIT Media-Lab, Abstract.

SKYGO, www.skygo.com, Mar. 16, 2001.

Tehrani, Nadji, Hardware, Software... Humanware, Telemarketing & Call Center Solutions, Sep. 1, 1997, p. 4, vol. 16, No. 3.

Terveen, Loren, Phoaks: A System for Sharing Recommendations Communications of the ACM, Mar. 1997, pp. 59-62, vol. 40, No. 3.

Thearling, Kurt, From Data Mining To Database Marketing, DIG White Paper, Oct. 1, 1995.

WINK, www.wink.com, Sep. 16, 2002.

Cameron, Paul S., Appendix A to Patent No. 5,592,378.

METHODS AND APPARATUS FOR INTELLIGENT SELECTION OF GOODS AND SERVICES OFFERED TO CONFEREES

RELATED APPLICATION INFORMATION

This application is a continuation-in-part (CIP) of U.S. patent application Ser. No. 10/335,060, filed 31 Dec. 2002; which in turn is a CIP of application Ser. No. 09/907,724, filed Jul. 17, 2001; which in turn is a CIP of application is also related to application Ser. No. 09/691,392, filed Oct. 17, 2000; which in turn is a CIP of application Ser. No. 09/505,619, filed Feb. 16, 2000 now U.S. Pat. No. 7,280,979; which in turn is a continuation of application Ser. No. 09/038,399, filed Mar. 11, 1998 now issued as U.S. Pat. No. 6,055,513. Each of the foregoing patents and applications is hereby incorporated in its entirety herein by this reference and the applicant claims the benefit of the filing dates of these parent applications to the fullest extent permitted under 35 U.S.C. § 120.

BRIEF DESCRIPTIONS OF THE DRAWINGS

FIG. 11 shows a depiction of a potential customer interacting via a wireless device.

OVERVIEW OF THE INVENTION

Figure 1:
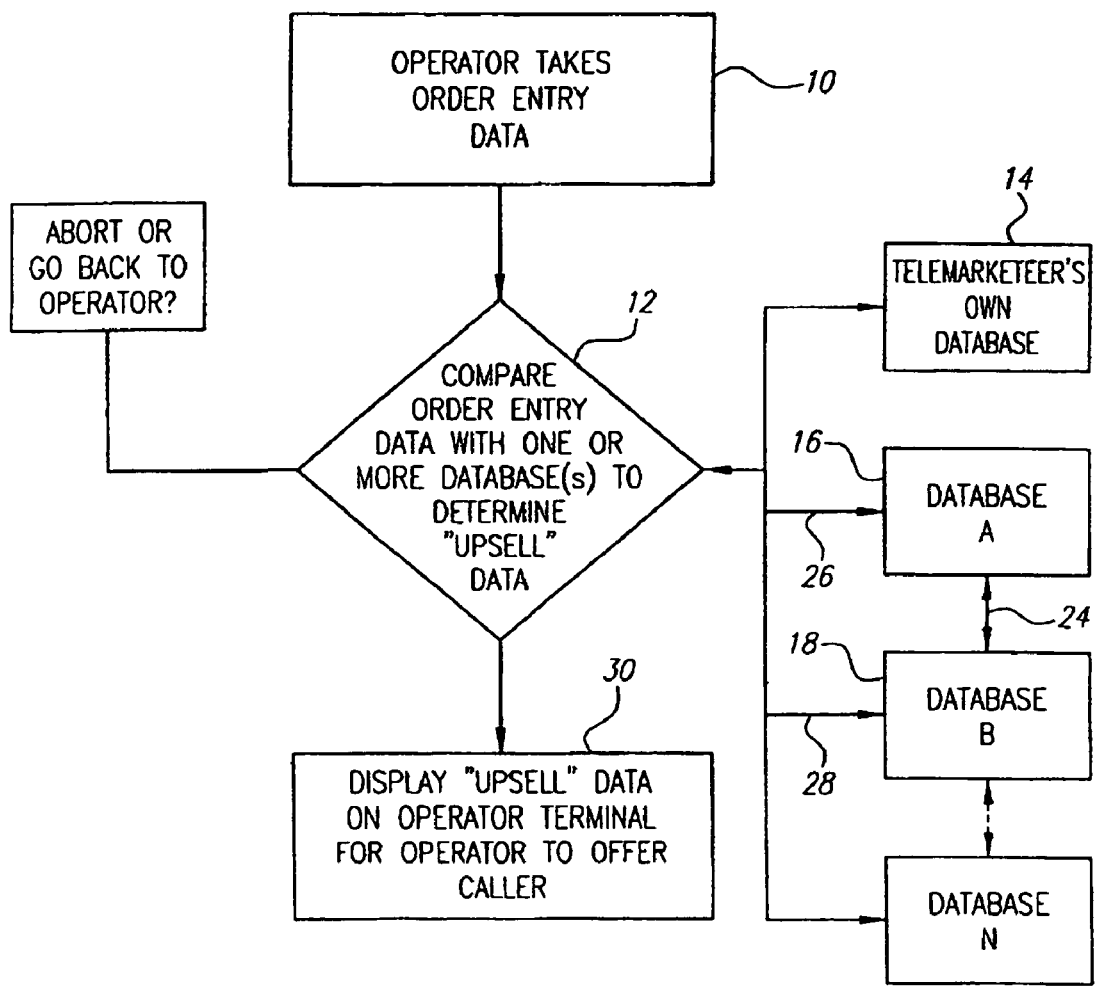
FIG. 1 is a simplified flowchart demonstrating aspects of the upsell system.

Apparatus and methods are provided for effecting remote commerce, such as in telemarketing (either inbound or outbound) and in electronic commerce, which are particularly adapted for the intelligent selection and proffer of products, services or information to a user or customer. In one implementation of the invention, the system and methods obtain input information for the system from a primary transaction, identify one or more goods or services for possible proffer and upsell to the customer based at least in part upon the primary transaction data information provided to the system, and thereafter, offer the user or customer one or more items determined to be among the optimum upsells.

In one aspect of the invention, a method provides offers of an item constituting a good or a service in the form of an offer for purchase of the item to potential customers as users of the system, utilizing an electronic communications device, such as a telephone, videophone or computer, comprising the steps of, first, establishing communication via the electronic communications device between the user and the system for purpose of a primary transaction; second, obtaining primary transaction data with respect to the transaction, including determining the identity of the prospective customer; third, obtaining at least a second data element relating to the user for the upsell determination; fourth, utilizing at least in part the primary transaction data and the second data element and determining at least one good or service item for prospective upsell to the prospective customer; and fifth, offering the item to the prospective customer.

In the preferred implementation of the inventions, the input information for the system includes primary transaction data and at least a second data element obtained from a database, especially a remote, third party database or databases. Primary transaction data may include data relating to or reflecting the initial or primary contact from the customer to the system. In operation, one or more databases may be accessed, either in parallel or series, to collect and assemble input information for the system to determine the upsell or intelligent product selection.

One example of primary transaction data includes transaction determining data, which provides an indication of the purpose of the call, for example, whether the primary contact was for purchase of a product, for a service request or an inquiry. Such transaction determination data may either be used to consummate the primary transaction or not. By way of example, a user initiating remote contact with a source of sales or services might initially contact the source desiring repair of a defective product, whereupon the transaction determination data indicating a repair contact may then be used as an input to the system identifying responses to be proffered. In such a circumstance, while the primary transaction data reflect a service contact, the customer may be offered in response a sales transaction for a new product which includes the functionalities of the product which formed the basis for the primary transaction.

Yet another aspect of primary transaction data may include customer identification data. Such data may be specific data in that it uniquely identifies the contact, such as in person specific data comprising an electronic address, an e-mail address, customer number, billing data or credit card number. Customer identification data may in some instances be less than person specific data, such as residence specific data. For example, a caller's telephone number, such as may be automatically supplied by the automatic number identification (ANI) service or other forms of caller identification, may identify a customer to the level of a residence. Optionally, additional data may be requested so as to specify a subset, e.g., a unique resident, from the household. At yet a less specific level of geographic granularity, identification data may include zip code data or other geographic identifier. Identification data may be obtained automatically from a carrier, such as through the use of ANI for telephonic communications, or through an electronic identifier for electronic commerce, such as transactions over the Internet. Alternatively, non-automatic entry may be utilized, such as where the customer or operator effects data entry.

Yet further aspects of the input information for the system may include a correlation system for matching primary transaction data or other input data with a corresponding or keyed designator number for obtaining yet further input information. For example, while an initial contact to a telemarketer may automatically obtain the caller's telephone number, such as from ANI, a correlation system may then provide a designator, such as a social security number, which may be utilized as an index or key for accessing yet further data bases or sources of information. For example, a caller's telephone number as provided as primary transaction data via ANI may through the correlation system result in a social security number or credit card number which may then be used to determine the credit worthiness of the caller from a database check. The collection of input information for the system may be effected based upon local resident databases, such as a telemarketer's database, or through use of third party databases, such as credit card or credit worthiness databases, or possibly, a combination of both local and remote databases. Any form or content for a local or remote database may be utilized which is consistent with the goals and objects of the invention.

Beyond credit databases and identification databases, numerous other options may be utilized. A demographic database may be utilized to identify direct or predicted attributes of the customer. Specific input information regarding the customer, such as age, sex, income, profession, education level, family status, lifestyle, and/or interests, may be used as separate and discrete inputs, or may be effectively combined to provide a coded designator based upon demographics, socioeconomic analysis or otherwise to provide a coded designator. A third party database provider, such as a credit card issuer (e.g., Visa, MasterCard, American Express), may not wish to provide specific, raw data with respect to a user, such as where they would specifically identify a customer's income as may be known to the credit card issuer through the credit application. In such circumstances, processed data may be provided such as through the use of the coded designator, previously mentioned. In this way, the third party database may provide responsive, effective information for the upsell determination, but yet preserve in confidence the specific details known to it regarding the user which is a customer of both the upsell service and the credit card company. Yet another type of third party database may include subscription information, such as telephone services subscription information as maintained by telephone companies or other carriers. Such information may include the types of service, such as call waiting, three-way conferencing or the like.

Yet another possible input to the system includes inventory data. Such data serves to minimize or preclude the offering of goods or services to a potential customer which are not then available, or which will not be available in a timely manner. Such inventory information may be used in a positive manner, such as an input for possible offers of an upsell, or in a negative manner, such as where a potential upsell has been determined but is then deleted from the possible proffers based upon its undesirable inventory status.

Yet another possible variable for use in the upsell or other selecting of a good or service for offer to the prospective customer is geographic information. Specifically, the geographic location of the potential customer may be utilized as a factor in the determination. By way of example, a customer utilizing a wireless device, such as a cellular phone, Palm Pilot VII, or other wireless communication or web access device, may provide geographic position information regarding the user of the system. That information may be obtained via global positioning satellite (GPS) information, or may be taken from a knowledge of the base station position or access device position. In the wired domain, the geographic position information may be obtained at various levels of granularity, such as through the use of area code information, or more specifically, exchange information, or yet even more particularly, through the use of various databases which map telephone numbers to specific geographies, such as a caller's street address. The geographic position of the user may be determined via an access point to a system, such as where a customer utilizes an automated teller machine (ATM), an electronic signature device, or a vending machine for purchase of transportation tickets or other items on a network. The geographic position of the user is known based upon their interaction with the network.

The geographic information may be utilized in combination with other information in determining an offer or upsell. By way of example, the system or access device may know the position of a potential user of a good or service based upon position information from a GPS system, and may utilize that information in offering a good or service, such as a discount coupon, at a geographically local store. Such an offer may be made as the result of a caller contacting the system, or may be provided in an outbound or push based context where the system contacts the potential user of the offer, such as by calling their cellular phone or other wireless device. The geographic position information may additionally be combined with data or information regarding the geography of the person. For example, if the positional information indicates that the person is in a casino at midnight, it may be a valid assumption to assume that the person is not risk averse. In yet another particular application involving a wireless communication device, a display, such as a billboard, may provide a telephone number or code (e.g., *72). By dialing the number, the system may generate a tailored response regarding the good, service or information upon any number of factors, such as knowing the identity of the caller via the mobile identification number (MIN), plus any associated information known about the caller. The use of a code on the billboard may be combined with the knowledge of the base station receiving the call, to uniquely designate the billboard and the requested information.

Another application of the upsell system is in conjunction with on-screen programming guides. Such on-screen programming guides present a viewer of a television or other display with information regarding programming, entertainment or other information categorized in a predefined manner, such as by channel and time. In such a system, the selection (either made or considered) by the user may be provided as input to the decision system. For example, if a viewer selects a Pay-Per-View sports event, that selection may be used as an input to the system as described generally in this application which then results in the selection and offer of another good, service or set of information for the potential customer. Continuing with the example of an order for a Pay-Per-View sporting event, the system may determine, through the various methods described herein, to offer the viewer a series of entertainment events, such as a seasonal football schedule. The input device for such an onscreen programming guide application in the upsell context could be a remote control operated by the viewer.

Yet another class of database information may include third party databases relating to items believed to be possessed by or desired by the customer. For example, a possession database may indicate that the system user possesses a certain formalware pattern, or has a certain number of place settings of a pattern. The status information regarding the possession and/or completeness of a set may be utilized as an input to the system to identify an upsell to the customer. In yet another aspect, a registry database which reflects desired goods or services may be consulted as yet further input information for the system for identifying the proffer.

The system for identifying the potential proffer utilizes the input information so as to generate one or more outputs comprising potential proffers to the user. Various selection methodologies are available, including historical selection criteria keying the proffer to what has effectively resulted in sales or successful transactions in the past, or proffers based upon demographic profile or other inputs as a designator for a potential upsell. In yet other selection methodologies, theme sales may be utilized such as where further goods are required to complete a set, such as a formal ware set.

In yet other aspects, the invention may include actions taken upon the historical factors relating to a specific customer or customer type. For example, the system may adapt to reduce the number or frequency of upsells if it is determined that the customer is unlikely to purchase, or a pattern or time basis to the customer's purchasing is detected or expected. Yet another historical factor may include a quality factor, such as where it has been determined or assumed that the customer is interested in a certain level of quality, and accordingly, the selection of the proffer is based in part upon the quality. In yet another aspect based upon historical factors for a specific customer, knowledge of a user's possession, such as based upon a prior purchase, may be utilized in the proffer. For example, where a computer sales entity possesses the knowledge that the customer owns a particular model of computer, that information may be utilized in the selection of a proffer, such as in the offer of increased computer memory, a new version of a software application or the like. Yet another historical factor may include obsolescence of possessed materials, such as through the passage of time whereby the possessed item becomes worn, outdated, or outgrown.

Yet other factors affecting the upsell may be based beyond those particular to the user. For example, proximity to key calendar events for others, birthdays, anniversaries or other typical gift giving days, may be utilized as a factor in the selection of the upsell. Further, the time of the contact may be utilized, such as where a user contacts the system during the nighttime, wherein an upsell more likely to sell to a 'night owl' will be offered as opposed to what is believed to effectively sell to a 'morning person'. Offers may vary based upon day of the week, or day of the month, such as correlation or actual or expected paydays.

In one aspect of the invention, multiple actions may be taken in one transaction. For example, while a credit verification is being effected for a primary transaction, a second credit check may be performed to determine available credit, which is in turn used as an input to the upsell determination system. In yet another aspect, multiple upsells may be selected, whereby multiple potential purchases are offered to the user either simultaneously or serially, and if serially, the reaction to an earlier offer may be utilized in the decision for subsequent offers.

After the upsells have been identified, they are offered to the user. In the telemarketing application, a script directed towards the sale of the selected product is provided to the telemarketing representative. In an electronic commerce environment, a display or other communication of the offer is made, such as through textual data, video, and/or audio communication. Additionally, information may be provided by additional or other modes of communication, such as e-mail, facsimile, independent phone contact, cable contact, etc. The proffer is typically accompanied by a solicitation to consummate the transaction. The results of the proffer response thereto may be utilized in the modification or updating of the system for identifying later upsells.

In one aspect of this invention, a method is provided for presentation of information to users of an electronic system comprising the steps of, first, establishing communication between a user of the system and the electronic system, second, determining characteristics of the user based at least in part upon the communication between the user of the system and the electronic system, third, determining the mode of presentation for the user based at least in part on the determined characteristics of the user, and fourth, presenting the information to the user in the determined mode.

In yet further aspects of the consummation of either or both of the primary transaction or the derivative, upsell transaction, an order fulfillment system may be utilized. Upon receipt of indication that the transaction is to be consummated, the system may so designate the product, and may automatically provide for shipping and billing of the user. Optionally, tracking of the item may be included.

In operation, a user establishes communication with a telemarketer (either with the user establishing communication in an inbound environment or with the telemarketer establishing communication in an outbound environment) or through other electronic contact, such as through a website contact or hit, upon which identity information regarding the user is either automatically obtained such as through the use of ANI or manually obtained, such as through entry of identification information by the user. The identity information may be specific to the user, or may be more generalized such as information relating to the type of primary transaction or interaction. A second data element is then obtained, preferably from a second, and most preferably remote, database which is then used in conjunction with the primary transaction or primary interaction data so as to select a subset of potential of offers of goods, services or information to the user. Upon selection, the goods, services or information are provided to the user, and if the interaction is for the purpose of sale, the transaction is preferably consummated. In the preferred embodiment, inventory checks for the proposed offer, as well as a credit authorization for the proposed offer, are made during the course of the communication, and most preferably, prior to the offer of the secondary item. In yet another aspect, the inventions relate to the intelligent selection and proffer of goods, services or information based upon an initial contact generating at least partial identification data, utilizing a remote, external database to develop yet further identification or information respecting the user, utilizing the collected information in the selection of the good, service or information to be provided to the user, and providing the same to the user. In one application, a user is identified during the course of a primary transaction, and identification information is utilized in an access of a credit card database, whereby raw, processed or coded designator information is obtained from the credit card provider, wherein the information is utilized in the selection of the further good, service or information to be provided to the user. In yet another aspect of this invention, the mode of presentation of the information to the user is based at least in part upon the identification information respecting the user. The mode of presentation may be varied based on demographic information, such as age, sex, income, occupation, education level, family status, lifestyle or interests.

In yet another aspect of this system, an electronic system permits the user of a web or other electronic commerce system to interact with a live operator. In this way, what has heretofore been merely communication between a user and a non-human system may divert the transaction to an operator/transaction assistant.

DETAILED DESCRIPTION OF THE INVENTION

FIG. 1 shows a hybrid block diagram and flowchart of one implementation of the system and methods of these inventions. The simplified depiction of FIG. 1 reflects aspects of a telemarketing implementation, though it will be understood that various structures and functionalities may be extended to other implementations, such as electronic commerce and the like.

By way of terminology, when the terms "user", "system user", "customer", "potential customer", "contact" or equivalent terminology is used, those terms are meant to refer to a person or entity to whom the efforts of the offering are at least in part directed. Variations in meaning as to this terminology may be taken from context, as necessary. The terms "good(s)" and "service(s)" while distinct, are intended within the scope of the patent to be used interchangeably, where appropriate given the context. When appropriate from context, a good or service may include a coupon, ticket, card or other promotional material, including printed material, having a value designator. Further, a "service" may include information or entertainment. The term "upsell" means an offer or provision of a good or service which is selected for offer to the customer and differs from the good or service for which the primary contact was made. The term "upsell" is not limited to the context in which a primary transaction is intended to be a sales transaction, but additionally includes the offer of a good or service offered in accordance with the selection criteria of the invention even if the primary transaction is not principally sales motivated, such as where an initial contact is for service or repair purposes. The use of "he" is gender neutral, and may be read as "he", "she" or "it". When the term "and" or "or" is used, they may be read in the conjunctive or the disjunctive, where appropriate from context.

Various aspects of the invention provide systems and methods for intelligently processing at least one primary transaction involving at least one user accessing a system using a communications device. The term "system" refers to any computer-based processing system that automates any type of interaction with the user. The term "communications device" refers to any hardware (for example devices having embedded processors or other "smart" hardware) useful for enabling the user to access any local, regional, national, or global communications networks such as local-area or wide-area computer networks (LANs or WANs, respectively). Example LANs can include computer networks linking various components of a merchant's computer infrastructure, while example WANs can include networks such as the Internet or the World Wide Web. The term "communications device" also refer to hardware enabling the user to access other wired or wireless communication networks such as the various public switched telephone networks (PSTNs) operating in different areas radio networks, cellular telephone networks, cable or broadcast television networks, satellite-based communications networks, or other similar networks currently existing or developed in the future.

Initially, a system user contacts the system for purpose of a primary transaction. As explained, however, the transaction need not be a consummated transaction. If the system user is a potential customer contacting a telemarketing system, at action (statement) block 10 a telemarketing operator may interact with the potential customer and take the order entry data for the primary transaction. Either upon completion of the primary transaction, such as through consummation of a sale or by program flow to further action prior to consummation of a sale, action (decision) block 12 is arrived at wherein data, such as order data or other primary transaction data is compared to one or more databases for analysis. The primary transaction may be a contact for a sale or other commercial transaction, a service or repair transaction or interaction, or may be for the purpose of an inquiry.

As depicted, a first database 14 coacts with action block 12. Typically, the database 14 is a locally resident database, such as the telemarketers own database. It should be understood that a locally resident database refers to any database configured for any access by the telemarketer, not necessarily one that is located at the telemarketer's site. Database 14, if a resident database, may handle matters requiring relatively quicker response, such as correlating automatic number identification (ANI) information received over the telephone or communication network with other identification or prior transaction information on the caller.

One or more other databases (database A-database N), such as database A 16 and database B 18 may be coupled to action block 12. As depicted, database A 16 is coupled via coupling path 24 to database B 18. Additionally, coupling path 26 interconnects action block 12 and database A 16. Similarly, action block 12 is coupled to database B 18 via coupling path 28. Any of the databases 14, 16, 18 may be interconnected as desired consistent with the intended functionalities of the systems described herein. Thus, though not expressly shown, the resident database 14 may couple to database B 18, either directly or via a path such as through action block 12 to coupling path 28, or via action block 12, coupling path 26, database A 16 and coupling path 24. These databases may be accessed simultaneously, or in any combination of parallel, serial, sequential or time access. Preferably, the accessing of multiple databases is performed in a manner to minimize any delay in effecting a real-time proffer to the user.

Secured communications are preferably utilized within some or all of the system. For example, encrypted messages or data may be utilized, such as when transmitting raw or analyzed data from, to or between databases. Further, privacy concerns are addressed by precluding or inhibiting the sharing of information between users, or between various database owners or content providers. Further, security qualification or entitlement restrictions may be utilized such as to the entire system, or parts of the system, such as databases.

Sources of input information for the system, such as primary transaction data and other input data for the upsell identifying system may come from any or all of action block 10, or other databases 14, 16 and 18. It will be understood by those skilled in the art that the number and interconnection of the various databases 14, 16 and 18 has been simplified for expository convenience, and is not intended to be a limitation on the scope or teaching of the invention. From action block 12, after the system identifies one or more upsell items for offering to the potential customer, offering block 30 serves to provide the selected items to the potential customer. In the telemarketing application, the telemarketer would at this stage have text or other information available to provide to the customer. Typically, a screen pop including a text directed towards the sale of the upsell item would appear, at which point, the telemarketing sales representative would verbally make the sales presentation to the caller.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein. By way of example, while routing of telephone calls and computer-based call handling have historically been relatively discrete, segregable functions, and further segregable based upon discrete equipment, the trend is towards integration and distribution of functionality more broadly within a system. Accordingly, the understanding of the inventions herein should be based upon the functionality, as implemented by selected structures, though not necessarily upon which particular unit of structure in which the functionality resides.

Figure 2:
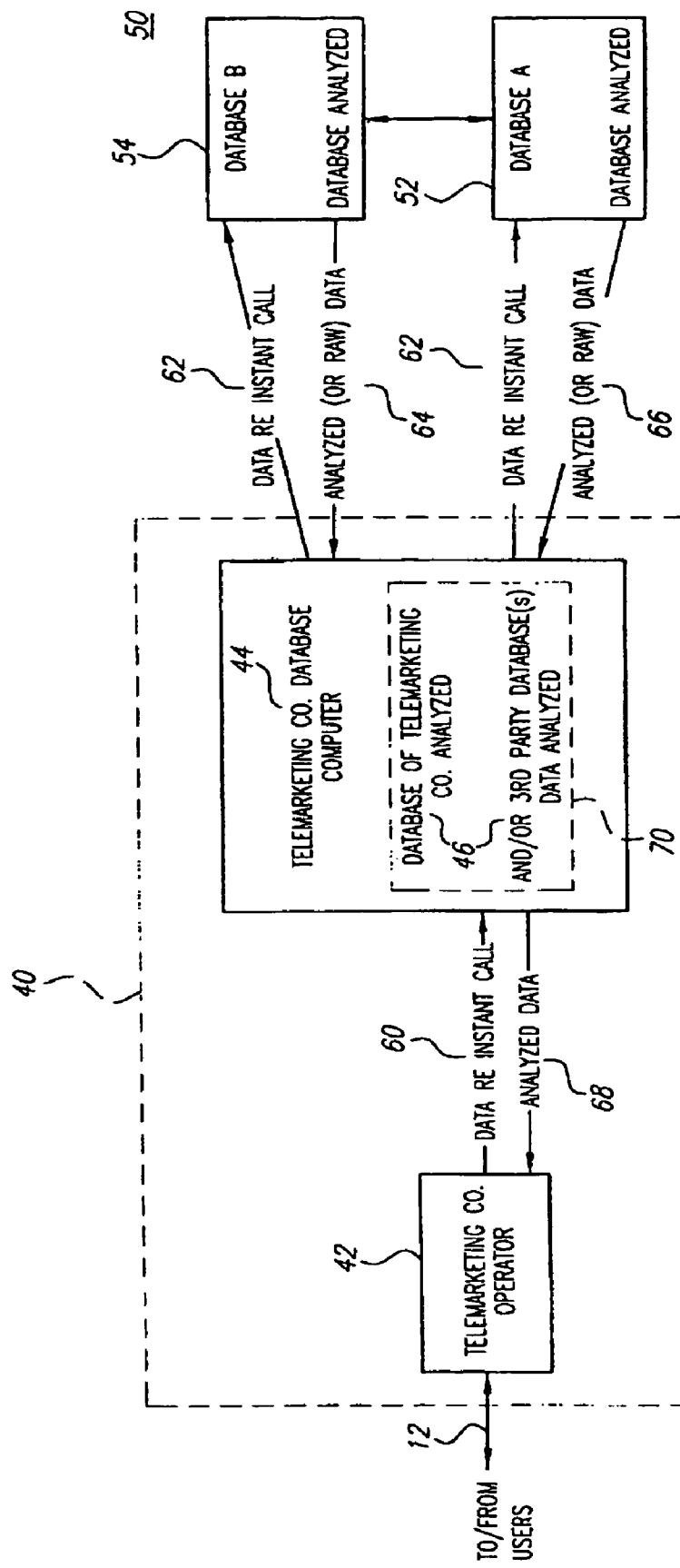
FIG. 2 is a block diagram of a system for implementing the methods of this upsell system.
Figure 3:
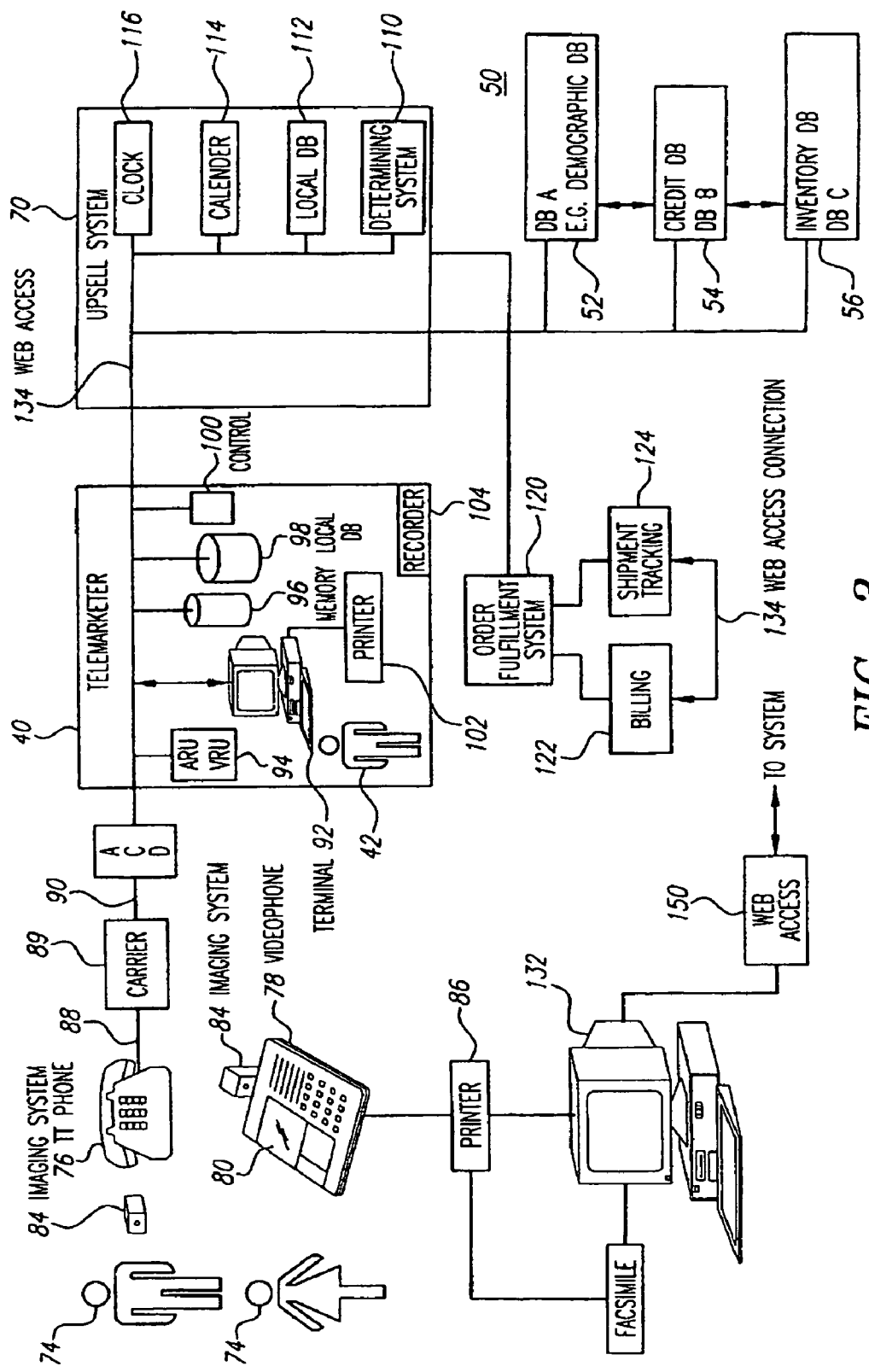
FIG. 3 is a flowchart for an Internet-based order transaction in accordance with the invention.

FIG. 2 is a block diagram of a simplified embodiment of structure usable to achieve the functionality of these inventions when suitably adapted for such use. FIG. 3 is a more detailed schematic diagram of one possible implementation of a structure for use in implementing the functionalities of the inventions here. When feasible, the same numbering will be used in various figures to describe any corresponding element. FIG. 2 shows a block diagram of a telemarketing system 40 adapted for communication with one or more databases 50, as well as a database 42 which may be integral or resident within the telemarketing system 40. Within the telemarketing system 40 are grouped various functionalities, including the telemarketing company operator 42, the database 44 resident at the telemarketing system 40 with its attendant computer for processing and control, as well as a computer 46 for analysis of the inputs and generation of one or more outputs for provision to the user. One or more external databases 50 may be included within the system. A first database A 52 and a second database B 54 are depicted, though it is to be understood that the selection of two databases 50, and the interconnection there between, is selected for expository convenience and is not intended to reflect any limitation on the structure or functionality of the system, provided the functionalities of the invention may be achieved.

FIG. 3 shows a block diagram of one implementation of a telemarketing system at a greater level of detail as compared to FIG. 2. While the following description is generally provided in the context of inbound telemarketing, the inventions herein may also equally be applied to outbound telemarketing. Users 74 (also known as customers, or potential customers) access the telemarketing system 40 via any known manner of telephone, telephonic instrument or its equivalent. As shown, telephone 76 comprises a touch-tone phone having a handpiece including a speaker and receiver, as well as an array of alphanumeric buttons for actuation by the customer 74. Alternatively, video phone 78 provides for both audio communication as well as image or video communication. The video phone 78 includes an array of alphanumeric buttons, a video display 80, typically a handset, and some imaging system 82, comprising a camera or other image generating system. A conventional touch-tone phone 76 may be utilized in association with a separate imaging system 84, if desired. In yet other modes, the customer or user 74 may interact with any other form of man-machine interface which is consistent with the goals and functionalities of these inventions. By way of example, but not of limitation, the customer 74 may interact with a computer, whether standalone or networked (by local area network (LAN), wide area network (WAN) or otherwise), which includes a communication capability (modem, etc.), or may comprise access capabilities to the Internet or web or internet television type systems. Yet further examples of devices permitting interaction between the user and the system include automated teller machines (ATMs), ATM-like devices found at grocery stores, gas stations, car washes, or the like, electronic signature devices used in credit card or other types of transactions, networked vending machines offering airline, train, bus, or other travel tickets, other types of networked vending machines, or essentially any electronic device adapted to provide communicative interaction with the user. Many of these devices may include textual displays, potentially video displays and optionally audio displays. Yet other display devices permitting interactivity include various wireless devices, such as the Palm Pilot VII, and Nokia communicator. Various other devices principally for entertainment and game play include the Sony Playstation and the Microsoft X machine. Yet another display device which may include an input capability comprises electronic books (e-books). Various input technologies may be utilized to contact the system, whether touch-tone input, keypad or mouse input, voice response technology, including nuanced voice recognition technology, remote controls, touch screens, etc. Yet another form of input device includes smart cards. A smart card stores information, such as information about the possessor of the smart card. That information may be provided from the card for use in the system. A smart card may include identification data, other personal information or preference data. Any or all of that information may be utilized in order to make a better selection of a good or service for offer to the customer. While the particular implementations and embodiments of the user 74 interface may vary, any interface which provides output to the customer 74 and permits return entry consistent with the functionalities to be achieved herein is acceptable.

Optionally, other devices such as a printer 89 may be included. These various devices then interface with a carrier 89. The interconnection 88 between the end instruments 76, 78 may be of any mode or manner, such as a copper wire connection, optical fiber, cable connection, wireless connection, cellular connection, satellite connection, or any other mode or manner of connection. Similarly, the communication path 88, and carrier 89 may utilize any type or mixture of carrier technologies, whether analog, digital, ISDN, or at any rate of speed consistent with the achievement of the functionalities described herein. Preferably, the carrier 89 includes the ability for provision of more advanced telephony services, including the provision of DNIS, the dialed number identification service, and some form of caller identification such as automatic number identification (ANI, caller ID, etc.). Typically, the DNIS and ANI information are provided from the carrier 89 to the telemarketer 40 over connection 90, and may be either in-band or out of band signaling, such as D-channel signaling in current time division multiplexed modes of operation.

FIG. 3 depicts the telemarketing system 40, and separately identifies the upsell system components 70. The upsell system components 70 may be optionally included broadly within the telemarketing system 40, or may be provided on a standalone basis, such as where the upsell system 70 is geographically distinct from the telemarketing system 40, and indeed where the upsell system 70 may be resident at a third party location and be utilized by one or more telemarketing systems 40.

The telemarketing system 40 interacts with the carrier 89 via communication path 90. Optionally, this path may include various additional structures and functionalities as known to those skilled in the art. For example, automatic call distributors may be utilized at the front end of the telemarketing system 40 so as to serve a routing, holding and/or load leveling function, either done or in combination with other hardware and/or software. Within the telemarketing system 40, one or more operators 42, typically wearing headsets for audio communication, interface with terminals 92 which provide for at least textual display, and optionally, graphic image or video display. The operator 42 interfaces with the terminal 92 through any mode or mechanism, such as a keyboard, mouse or other pointing device, or any other man-machine interface for data entry or communication. Conventionally, the operator 42 is a live operator, though optionally the generation of audio images or video for presentation to the customer 74 may be synthesized or simulated or represent virtual reality. By way of example, a text-to-speech unit or other form of recorded speech may be utilized. An audio response unit 94, also termed an interactive voice response unit, may be utilized to provide some or all of the customer 74 interaction. Additional structures and functionalities required for the operation of the telemarketing system 40 may include local memory 96, local database 98, control (processor unit) 100 to provide overall coordination and control of the various components of the telemarketing system 40 and its interaction with the other units described. Additionally, a printer 102 may be provided for generating a hard copy record, such as of order transactions. Additionally, a recording unit 104, whether for audio, images, or both, may be included.

The upsell system 70 typically includes a determining or type analysis system or unit 110 which serves to receive the various inputs for the determining unit and to generate outputs relating to possible upsells for the customer 74. Optionally, a local database 112 is provided within the upsell system 70. Chronological information, such as provided from a calendar 114 and/or clock 116 may be utilized within the system. The databases 50, whether resident or external, are shown as database A 52, in this depiction being a demographics database, database B 54 being a credit database and database C being an inventory database.

Optionally, the system may include an order fulfillment system or unit 120 which is coupled to receive outputs from the telemarketing system 40 and/or the upsell system 70 indicative of a consummated transaction requiring fulfillment. Optionally, a billing unit 122 and shipping/tracking unit 124 may be utilized in conjunction with the order fulfillment system 120. An electronic notification (such as by e-mail) that an item has been shipped may be provided.

A simplified interconnection is provided in FIG. 2 and FIG. 3. The selection and arrangement of the interconnection, as well as its implementation, are matters which are known to those skilled in the art and depends upon the particular technology in which the system is implemented. Any interconnection or mode of implementation may be utilized which is consistent with the achieving of the goals and functionalities of these inventions. Yet other modes of accessing the system may be utilized. For example, electronic or web access 130 generically depicts access through communication networks, such as through Internet access, cable, television, direct broadcast, satellite broadcast, e-mail, facsimile, voicemail or otherwise. The web access 130 may connect via web access connection 134 to some or all of the various portions of the system, such as the shipping/tracking unit 124 so as to check on shipping or delivery information, the billing unit 122, or to directly access the upsell system 70 as a variation on the point of entry into the overall system. When considering access in a non-telephonic, though still electronic manner, reference should also be made to the descriptions of FIGS. 4 and 5 relating to Internet or web-based access and systems.

The depictions in FIG. 2 and FIG. 3 will be used now for a brief description of one mode of interaction of the customer 74 with the telemarketing system. A customer 74 may utilize a video phone 78 to dial a toll-free telephone number in response to observing a promotion for a good or service. The carrier 89 effects telephonic connection to the telemarketing system 40 preferably providing DNIS information which is utilized by the control unit 100 and local database 98 to provide a textual display on terminal 92 for use by the live operator 42 in interacting with the customer 74. Additionally, the carrier 89 may provide caller identification data, such as ANI data, which may be utilized by the control unit 100 to retrieve information from the database 98 particular to the customer 74. In addition to database 98, geographic designator programs exist which may be utilized to receive ANI data and to identify the geographic location of a customer such as by zip code, or more particularly, by zip code plus four. Based upon the retrieved information as provided to the live operator 42, a dialog is conducted relating to the primary transaction for which the customer 74 made the primary or initial contact with the system. While handling the primary transaction, the system may access one or more databases 50, such as a credit database 54 and a inventory database 56. If the user's credit card number has been obtained, such as during the primary transaction, or is otherwise known to the telemarketer through prior contacts or is devined via a correlation system, the credit card number may be utilized to obtain raw or analyzed data regarding the caller. The response from the credit card issuer or processor may be specific, such as providing data on the user's income, sex, history of purchase transactions or any other personal or demographic information known to it, or may provide a analyzed, coded message in response. The credit information, personal information, demographic information, possession information or other form of input data is then used by the system to generate the upsells or other real time provision of a secondary transaction. The secondary transaction may relate to the offer of a good or a service, or to a coupon, ticket, card or other promotional material having a variable or designated value for the purchase, lease or other acquisition in the future of a good or a service. In the preferred embodiment, there is a real time offer during a real time transaction. If the transaction is consummated, an indication may be provided to an order fulfillment unit 120 and attendant units such as the billing unit 122 and shipping/tracking unit 124.

Within the contemplation of the inventions, while a customer 74 is interacting with the operator 42 with respect to the primary transaction, the upsell system 70 is obtaining various input information for generation of a potential upsell item. As shown in FIG. 2, data regarding the instant call 60 may pass from the telemarketing system 40 to various databases 50, such as directly through path 62, or alternatively, from database A 52 to database B 54 via path 70. Database A 52 may provide in return, analyzed or raw data 66, and similarly database B 54 may provide analyzed or raw data 64 to the analysis system 70 for processing in accordance with the inventions herein. Upon generating the potential upsells, that information is provided to the telemarketing system 40, for presentation to the operator 42 on the terminal 92. As described in more detail in connection with FIG. 8, multiple options may be presented for selection by the operator 42. If a transaction is then consummated with respect to the upsell, the order fulfillment unit 120 and associated units may be utilized as in connection with the primary transaction. As described further below, the data from the proffer of the upsell may then be utilized in subsequent transactions, such as by storing the information in memory 96, or by utilizing it in connection with the determining unit 110.

Reference has been made to the provision of analyzed or raw data 66 in connection with databases 52, 54. The following discussion applies generally with respect to the form of data provided. A database access may provide raw data, such as specific data relating to a given user, e.g., a particular user's income. A system may also provide analyzed or processed data, such as where not all of the data provided is raw data, but includes processed data, e.g., a coded designation indicative of certain aspects of the user. By way of example, third party database possessors often maintain substantial raw data specific to their customers. Financial institutions and transaction processors, such as banks, brokerages, credit card issuers, credit card processors, have extensive databases either from data provided to them such as through application, forms or which is known to them due to their continued course of contact. For example, a credit card company may both know specific raw data relating to a customer through the customer's indication of its income on the original application, but may also possess data relating to purchases (such as transaction frequency, amount, type, item and location) which are obtained in the course of processing the transactions of the user. The third party database owner may be unwilling or unable, e.g., due to legal restrictions, from providing the raw data to other parties for their use in telemarketing or electronic commerce applications. However, process data which does not specifically reveal information of the user may be provided. For example, a coded designator may be provided from the third party database to the transaction or upsell processor, typically through agreed upon codes and formats, whereby the required information is provided, but in a generic enough manner so as not to raise privacy or other concerns. For example, a designator code XYZ may relate to a user with an income over $50,000, expected net worth of $75,000, is a homeowner, and has an interest in stereo equipment. In this way, the specific confidential information of the user may be preserved, while providing effective input for the processing or upsell system. One or more coded designators may be provided. Coded designators may be provided at a finer level of granularity, such as one designator to indicate whether or not the user is a homeowner, has an income within a defined range, etc. In this way, multiple designation may provide a more complete description.

Figure 4:
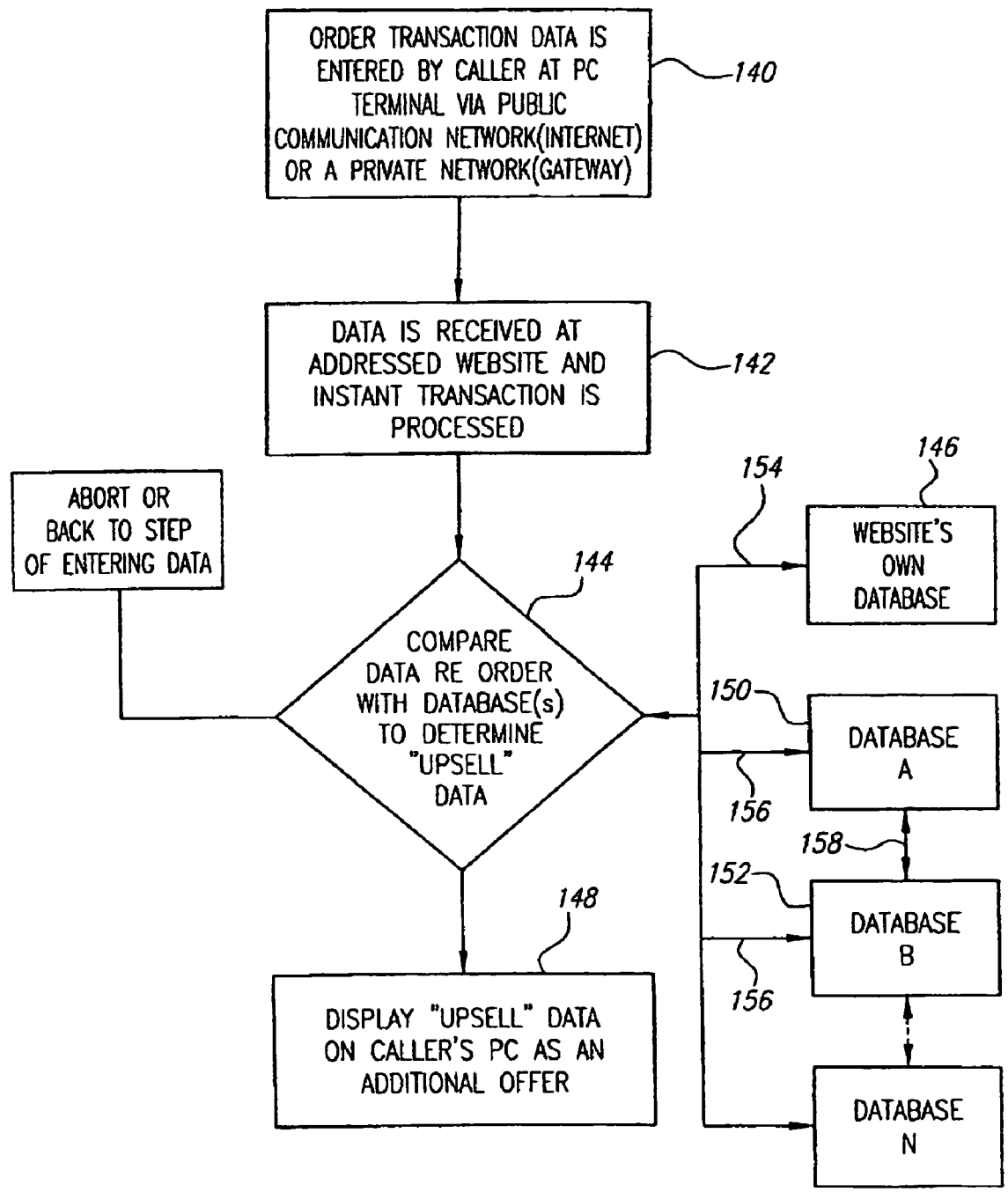
FIG. 4 is a block diagram of a system adapted for telemarketing applications.
Figure 5:
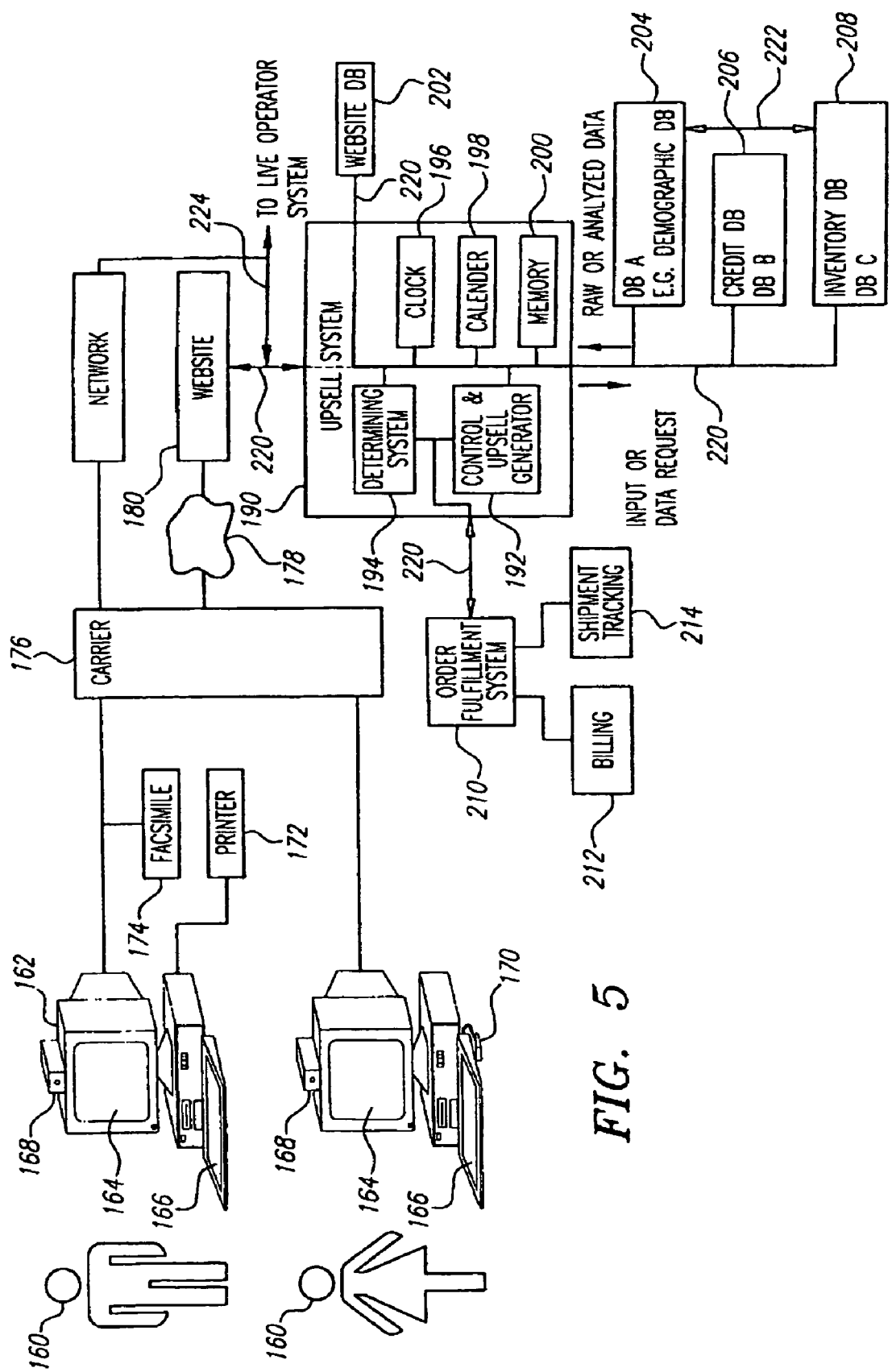
FIG. 5 is a block diagram of a system adapted for Internet or other electronic commerce use.

FIG. 4 shows a simplified flowchart and block diagram depicting an Internet, web-based or other electronic commerce system for performance of the inventions herein. FIG. 5 shows a detailed block diagram of one optional implementation of such a system. To the extent that description provided with respect to other figures described the same or similar structure or functionality, the description is incorporated herein by reference.

As shown in FIG. 4, a user interacts with the system via contact block 140 such as by having a primary transaction comprising an Internet order transaction being entered or effectuated by a user at a personal computer (PC) terminal. During the course of the primary transaction, processing step 142 serves to receive data at a address website and process the primary transaction. That transaction may be optionally consummated or not as suits the overall purpose of the transaction. By way of example, if the upsell serves to obviate the purpose for the primary transaction, such as when the primary transaction is for customer service or repair, and the upsell is successful in providing the customer with a new product in replacement thereof, then the primary transaction need not be consummated in the manner contemplated by the user at the point of initial contact 140. Continuing with the flow of the program, at analysis block 140, the various inputs for use by the analysis system are collected, and subsequently analyzed. In the course of this collection and analysis, various sites, such as the websites own database, 144, remote database A 150 and/or remote database B 152 may be accessed. The coupling 154 between the analysis system 144 and the website database 146, as well as the couplings 156 to the external or other databases, 152, as well as any coupling 158 between the databases 146 (coupling to other databases not shown), 150, 152, may be implemented as known by those skilled in the art. The particular selection of interconnections between various components is left to selection of implementation, where the implementation merely needs to be consistent with the goals, objects and functionalities of this invention. Upon completion of the analysis at analysis block 144, the output of the analysis block 144 is provided to the user through action block 148. The upsell data may then be displayed on the caller's PC as an additional offer, or in lieu of the primary transaction.

FIG. 5 depicts one or more users 160 (also referred to as customers or potential customers) who interface with the system via a computer 162. Typically, the computer 162 includes a display 164, such as a CRT or flat panel display, some input device such as a keyboard 166, and optionally a mouse 170 or other pointing device, and may optionally include an imaging unit 168 to image the user 160. Additional devices such as a printer 172, such as to provide a permanent transaction record or to print images regarding proffered goods or services may be included. Similarly, a facsimile machine 174 may be included, and may be connected to a telephone system for effective communication. Again, any type of human/machine interface consistent with achieving the goals and functionalities of the instant inventions may be utilized with this system. A carrier 176, such as an on-line access service, cable access service, network, or other wired or wireless connection may be used to access the desired website 180. As depicted, connection path 178 is provided which serves as a generalized descriptor for a path, such as a Internet established routing, network routing, or other routing for connection of the user 160 for the website 180. The term website 180 is not intended to be a term of limitation, but rather of generic description, to be an intermediate or terminal node or contact point in the effecting of the electronic provision of goods or services so as to result in commerce or information transfer. While the website 180 may be a site on the Worldwide Web (WWW), it need not be so. The underlying aspects of this invention more broadly encompass the functionalities and structures to achieve them, as those particular implementations to achieve them are modified over time.

The upsell system 190 includes a control and upsell generator system 192, such as implemented through a special purpose computer or a general purpose computer program or otherwise adapted to achieve the functionalities described herein. The program may be implemented in a linear programmed fashion, or may use other decisional bases, such as expert systems, fuzzy logic, neural networks, adaptive systems, or other decisional systems known to the art, and which effectuate the desired functionalities of the inventions. Further, a determining unit 194 may be included to provide an indication of the purpose of the original contact in the primary transaction. Clock 196 and calendar 198 provide date or chronology information, and may be combined as a single unit. Memory 200 may serve to store program information, input information to the control and upsell generator 192 or other data required for effective operation of the system. The website 180 may include its own database 202, either directly connected to the website 180 or to the upsell system 190. Various databases, including database A 204, e.g., a demographics database, database B 206, e.g., a credit database, and database C 208, e.g., an inventory database, may be accessed. Optionally, an order fulfillment unit 210, and associated billing units 212 and shipping/tracking unit 214 may be included as described in more detail with the telemarketing system. The interconnects 220 between the website 180 and the upsell system 190, and between the upsell system and various databases 202, 204, 206, 208, as well as the coupling from the upsell system 190 to the order fulfillment unit 210. Optionally, a connection 224 to a live operator system, such as the telemarketing system previously described, may be utilized. In this way, while an initial access for a primary transaction is provided to a website, through program flow (where the operator may initiate contact with the user) or at the election of the user (where the user may initiate contact with an operator) 160 may be placed in connection with an operator. Such an option provides for the ability to provide individualized interaction between the user 160 and the overall system for the provision of electronic commerce or information transfer.

Figure 6:
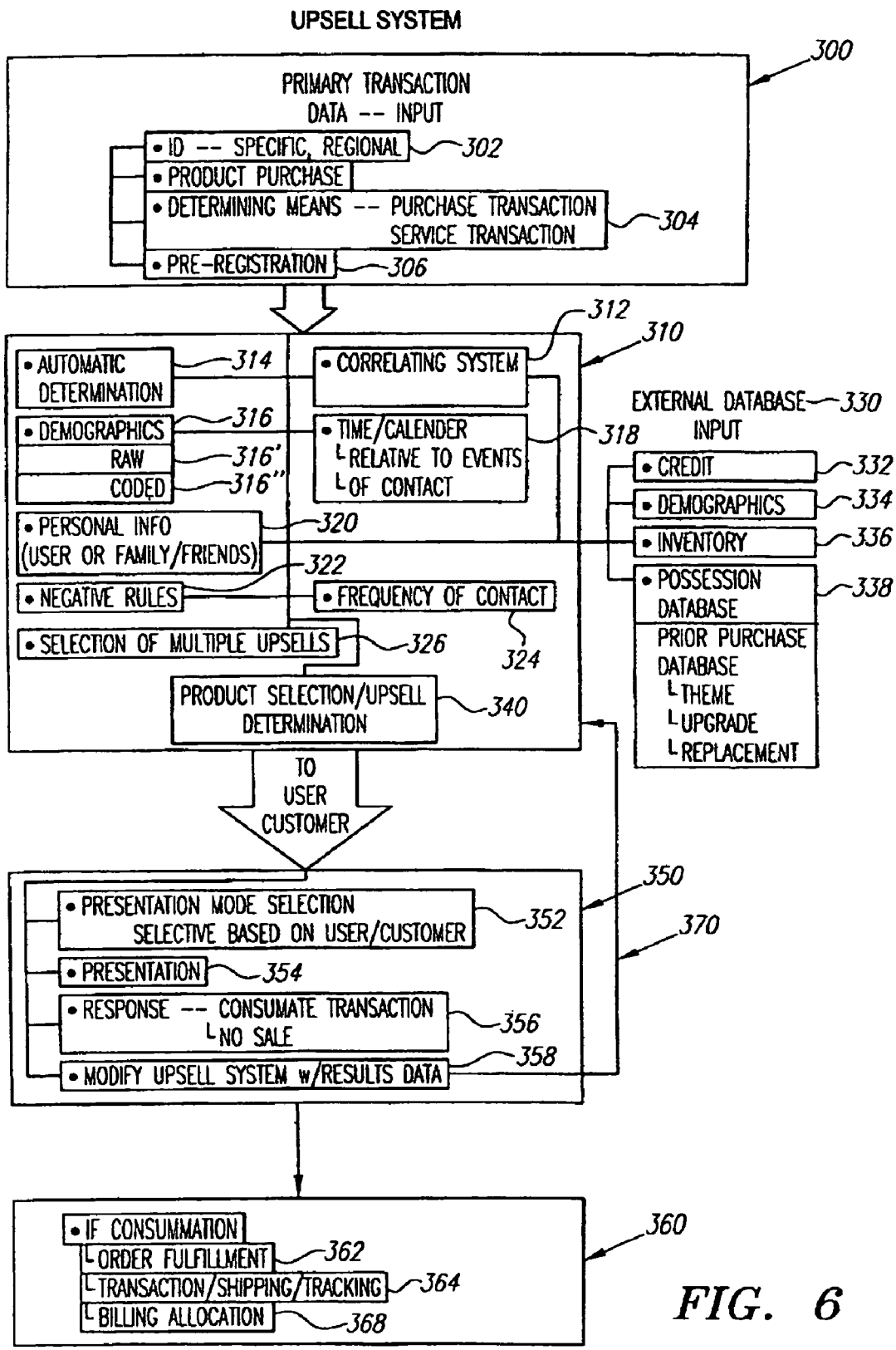
FIG. 6 is a block diagram of the functional aspects of the system.

The various steps in the typical operation of the overall system will now be described, with contemplation that the description may apply to telemarketing-based systems as well as electronic commerce-based systems, the applicability of the particulars to be taken from context. The description will relate to FIG. 6 which shows various interconnected functionalities, and will relate to other figures when noted. Broadly, the following discussion will relate to the primary transaction, both as to the data and completion or consummation of the primary transaction second, to the upsell determination or other identification of specific proffers to the user, and finally the conveyance of that information to the user and the action or consummation taken after that provision of information to the user.

As to the primary transaction data 300, in a first aspect the primary transaction data may include a type of contact component 304. The type of contact may designate a purpose, particularly a primary purpose, for the original contact by the user. By way of example, a type of contact may be a purchase contact, or alternatively, may be a service contact. A system such as the determining unit 194 (FIG. 5) may generate the indication of the type of contact. The type of contact may be determined from the address information utilized by the user, such as where different telephone numbers are provided for sales as opposed to services, in which case the dialed number or DNIS information directly provides indication of type of contact. Alternatively, the selection may be designated by the customer, such as where a menu selection is provided, e.g., press 1 for sales, press 2 for service. The type of contact may also be indeterminant, such as when the user has contacted a site without a specific purpose in mind. The type of contact may be defined at various levels of specificity, such as an indication that the type of contact was for purchasing generally, though without intent as to purchase of a specific item, to the presumption that the type of contact was specifically for purpose of a particular product.

A second aspect of the primary transaction data may include customer identification 302. Customer identification may be specific to a customer. Examples of specific customer identification would include a user's social security number, customer number, personal identification (PIN) number or other designator uniquely identifying the user. In the electronic realm, the customer identification may comprise an e-mail address, e.g., jasmith@aol.com, and Internet provider identification, or a source designator on a network. Various forms of electronic signatures may be provided which serve an identification, verification and authentication function. At a lesser level of specificity, namely, one at which a specific user may not be identified, various forms of identification exists. For example, a telephone number may provide geographic indication, such as through knowledge of its area code, or provide even more geographic specificity through the prefix. Other geographic descriptors, such as zip code or the finest level of geographic granularity (zip code plus 4) may be utilized. A residential customer number may not yet specify a particular customer within a household or location. Other forms of address, such as fax number, may be utilized to provide a local identification.

The user may be identified in yet other terms. For example, the user may be identified based upon the specific items being purchased, or more broadly, the type of item being purchased.

Further, the user may be identified by a quality factor, that is, some indication as to the perceived quality of the goods the purchaser may be interested in, such as based upon the initial contact. If the potential customer has contacted the system with respect to a high-end product, the system may classify the caller as one interested in high-end goods. Further, the timing of contact may be utilized to classify a caller. For example, a "night owl" who contacts the system after midnight to purchase computer products may be identified differently from a user who contacts the system at 6:30 in the morning.

As yet another aspect of identification, multiple individual items of identification may be combined or otherwise utilized in combination to provide yet further identification, confirmation or verification of identity.

While user identity may be obtained from the particular contact with the system, that identity, or further identifying data, may be entered during a preliminary or registration phase 306. In such a phase, additional information may be acquired. The data may be acquired in response to specific questions, or through an iterative or interactive approach.

Optionally, the forms of identification may be used in combination to provide higher level of specificity, such as to move from a local identification to a specific customer identification. One mode is to utilize further specific identification, such as initials, or to otherwise designate an identity. Alternatively, or in combination, once the suspected specific customer identification is arrived at, this may be confirmed with the user, e.g., by confirming "Is this John Smith?". Verification may be utilized, such as through provision of personal data, or through provision of an electronic signature or other secure and verifiable means of identification.

The identification may be obtained either automatically or in an non-automatic fashion. Automatic collection of identification may include the receipt of ANI information or electronic identification for electronic commerce or information provision. Non-automatic methods may include data entry, typically in response to prompts, such as through use of an interactive voice response unit.

The final aspect of the primary transaction is the completion or consummation of the primary transaction. In one implementation, the primary transaction may be completed, such as through consummation of a sale or completion of a service call or request. In yet other aspects, the primary transaction may be concluded, though not with the provision of the originally contemplated good or service. For example, in the context of a service contact, if the upsell is successful in providing the user with a replacement product, the primary transaction need not be completed. Optionally, at the caller's discretion, the primary transaction could be completed, such as where a caller does purchase a replacement product, but yet still wishes to obtain service on the product which form the basis for the original contact, and for the upsell.

After the primary transaction phase 300, the item selection phase 310 is entered. Within the overall contemplation of the system, it may be desirable to include a correlation unit 312 for matching one or more initial contact designators with yet another designator adapted for use in subsequent processing, such as database access. For example, when a caller's telephone number is obtained, and a specific identification arrived at, the correlation unit may provide the user's social security number for further access to databases in which that number provides a key or address. By way of example, third party databases may require specific forms of identification for accessing the databases, such as a combination of social security number and PIN number and that information may be provided from the correlation unit based upon the identification data obtained from the user. In this way, different outputs may be utilized for accessing third party databases, keyed to those databases, without requiring the user to excessively input identification information. Once the correlation unit has obtained unique, individual identification, it may provide the other forms of identification to yet further databases or other components in the system.

The identification of an upsell product or offer is divided into the aspects of identification and obtaining of inputs 300, the upsell determination 310, the output for subsequent offer 350 and, if applicable, order handling 360. As to the inputs for the upsell determination, they include the identification data 302, described previously. Further, demographic data 316 may be utilized relating to the user. The demographic data may be obtained from a database and be either raw data 316' or analyzed data 316". Data relating specifically to the customer 320 may include age, sex, income (either actual or estimated), profession or occupation, education level, family status, e.g., married, divorced, widowed, children, grandchildren, and specific data relating to them, lifestyle indicators, e.g., active outdoor, etc., address (specific address, city of residence, county of residence, state of residence, zip code, zip code plus 4), known interests, known subscriptions, known affiliations (e.g., service organization, alumni association, fraternal organizations, charitable organizations, etc.). In addition to specific information on users, the user may be associated with a code or designator which indicates others of a expected or suspected similar set of interests or reactions to an upsell. For example, the system may identify by code "422" those who are males in the 35-40 year old age bracket, with incomes in excess of $40,000 per year, with an interest in computers. That code may then be used as an input to the upsell selection system.

Credit data 332 may be checked in the course of the primary transaction, as well as in the course of generating inputs or processing for the upsell determination. In one aspect, the credit verification may take place in conjunction with a credit verification for the primary transaction. If the primary transaction is a purchase transaction, the credit verification may be obtained for the primary transaction, and then either obtain a specific credit authorization for an amount equal to the expected upsell, or obtain an indication of the amount of available credit remaining. If the amount of available credit remaining is provided, that will provide an indication of the preferably upper bound on the cost of the upsell offer.

For some appropriate types of primary transactions, a fica score or other comparable credit score is used to assess credit risk. A fica score may also be combined with other data such as loan-to-value percentage, home equity, net income, or other factors used to determine credit risk. Ideally, the factors used by the system will be based upon historic data that more clearly identify the level of risk. If it is available, a given system may incorporate data obtained from prior customers or users of the system, which will reflect the attributes expected of future customers. A credit risk score may then be assessed and used as an input in processing the upsell determination.

Yet another form of database information includes inventory data 336. In determining the items for upsell, the inventory database may be consulted before, during, or after the upsell determination. The upsell may discount the offering of a product which is unavailable at that time. In another aspect, the system may yet still offer the product if it will become available in a timely manner. As yet a further aspect of inventory status, a delivery time window may be included, such that if the product cannot be obtained from inventory and delivered to the customer in a timely manner, that product is not offered as an upsell.

Third party possession 338 databases may be utilized. A manufacturer may maintain a database which maintains what it believes to be an accurate count of items possessed by the user, or an intended recipient of the sale or upsell. For example, a seller of china or formal dining services may maintain a database of the number of place settings of a particular pattern owned by a potential recipient of yet further settings or related goods. In this way, an input to the upsell determination unit may include the offer of specific items of merchandise which complete or compliment existing possessions.

Turning now to the upsell determination 340 or the selection of the product or service for offer, generally, the system comprises a multiple input, dynamic, preferably real-time system for the selection of a suggested product or service to offer to a potential customer or user. The process includes the identification or selection of a set or subset of all possible goods or services available for offer, with the goal of optimizing the likelihood of upsell, as well as achieving customer satisfaction.

In one aspect, the upsell determination system may utilize, in whole or in part, a system which bases the offer of an upsell based upon prior successful upsells. Thus, if a customer is categorized as being in class 422 who called a telemarketer to buy product X, and was successfully upsold product Y, if a later customer in class 422 contacts the system, the past success may be utilized as a factor in again offering the product Y to the caller.

Various historical factors relating to a specific customer, or to known classes of customers may be utilized. The selection criteria may include negative decision criteria, such as not trying to upsell a customer on an item that the system knows he has previously purchased, or has previously been offered but declined to purchase. Yet another form of negative decision criteria consists of not offering as an upsell a product which is competitive to the underlying or primary transaction. The competiveness of the primary transaction and the upsell transaction may be in the nature of different types of goods for the same purpose, such as where the primary transaction relates to a gas barbecue but the upsell transaction relates to a charcoal barbecue. Alternatively, the competitive nature may relate to the source of the goods or the sponsor of the call, such as where the primary transaction relates to a first merchandiser, but the second or upsell transaction would relate to a second merchandiser believed to be competitive to the first merchandiser. By way of example, if the primary transaction consisted of a call to LL Bean, the upsell transaction may be subject to a negative criteria such as to not offer an upsell to Lands End. The negative criteria constituting the competitive goods or vendors may be defined in a list stored in memory within the system.

In yet another aspect, a negative criteria may consist of a determination that the caller simply is not a good prospect for a potential upsell. For example, if it is determined by the system that the probability of consummating the upsell transaction is less than a certain percent, e.g., 20%, it may not be economically beneficial to continue with the interaction with the user. This negative criteria has particular applicability where toll or transport charges are incurred by the sponsor of the system, e.g., such as where a telemarketer pays the charges for the "toll free" call to the telemarketer. In one form of a business model, the sponsor of a primary transaction may be willing to permit an upsell offer to be made, for a fee, upon the completion of the primary transaction. The fee may be a monetary fee, a service fee, an upsell offer made during a primary transaction of another sponsor, or other consideration. For example, if LL Bean is the sponsor of the primary transaction portion of the call to a telemarketer or a contact to a website, they may be willing to permit an upsell offer to be made on behalf of another vendor in return for a fee. Considered in light of the negative decision criteria, if the cost of the fee to offer the upsell paid to the sponsor of the primary transaction exceeds the probability weighted return to the sponsor of the upsell, the negative decision criteria may suggest to forego the upsell offer with regard to that user or caller. To provide a specific example, if the sponsor of the potential upsell must pay the sponsor of the primary transaction $3.00 for the opportunity to offer an upsell to the customer of the primary transaction vendor, and if the return for a consummated upsell transaction is $10.00, if the probability of consummating the upsell is less than 30%, the negative decision criteria may be set such that the upsell is not made, or that an alternative upsell is offered.

In yet another implementation of negative criteria, a list may be obtained or generated which comprises a list of potential customers to whom no offer is to be made. The negative criteria may relate to the upsell transaction, or more generally, to both the primary transaction and necessarily, the upsell transaction. Such a list might consist of customers who have exhibited high historical rates of return of merchandise, or who have engaged in illegal or fraudulent activity in the past.

With regard to the negative decision criteria, various actions are possible. One option is to block the call or contact such that the caller or user never is able to even initially access the system. Yet another action may consist of shortening the call so as to terminate the interaction earlier than would otherwise be expected.

In yet another aspect of an upsell transaction, it may occur that a caller or Internet user has requested to be included on a "do not call (or contact)" list. When a person contacts the system and is identified as being on such a list, it may be desirable to offer them the good, service or information that the vendor is otherwise precluded from offering. By way of example, a person may have requested to be on a do not call list regarding long distance phone service solicitations. Should that person call or contact a system for a primary transaction, and is then identified as a person on a do not call list, the vendor who is precluded from contacting the potential customer may pay a premium for the chance to upsell their service to the potential customer.

The system may utilize prior purchases as a factor in determining the upsell for offer. Prior purchases may indicate areas of interest, suggesting the offer of further goods within that general area of interest. For example, a customer who has previously purchased clothing for use in mountain biking may be more susceptible to an offer for mountain bike related goods or services. In a similar vein, theme sales may be utilized. When it is known that the customer has previously purchased a portion of a set, the completion of the set may be a goal. Certain theme sales are based on periodic introduction of a new item, such as a yearly addition of a tree ornament or the like.

Other factors affecting the upsell may include inputs comprising areas of interest, such as based upon known subscriptions, prior contact of the user to other sites, such as other Internet sites may be utilized by the system to determine a user's possible interests, and therefore, their susceptibility to the upsell of particular goods or services. Yet another aspect of basing the upsell selection on prior purchases may include upgrades to prior purchases. For example, where the system determines that the user has previously purchased a computer of a given make and model, the system may offer as an upsell a good or service particularly adapted to improve the performance of the system of the user, such as provision of additional memory, or other modified component. Similarly, if a user is known to have a given version of software, the system may elect to offer a new version of the software. Obsolescence of prior purchases may be determined. This may be from the passage of time, updating of a product, or outgrowing of a prior purchase.

Yet other facts affecting an upsell may include relative considerations. For example, relative proximity to key calendared dates 318 for the user, or others associated with the user, may be incorporated. The relationship of traditional gift giving days to the date of contact may be utilized.

Examples would include proximity to known birth dates, Christmas, Hanukkah, anniversaries, Valentines Day, etc. Further, family or relationship status may be utilized, such as offers of products for purchase for children, grandchildren, or others with whom there is a known established relationship.

The frequency of the upsell may be varied based upon expected receptiveness to the upsell at that time. Certain users may, through past particular experience with that user or through assumed desirability based upon studies of others, may determine the frequency with which upsells should be offered, whether to offer an upsell every time there is a contact, every other time, only in association with certain days or date (such as pay days), etc. The frequency may also be decreased if the user has manifested a lack of receptiveness to the offers in the past, or to a certain type or class of offer.

Multiple upsell items 326 may be utilized. In the telemarketing context, the telemarketer may have displayed to them multiple options, either for selection by the telemarketer, or for sequential presentation to the caller. In the electronic commerce context, multiple offers may be made such as on a screen, or provided sequentially to the caller.

Figure 8:
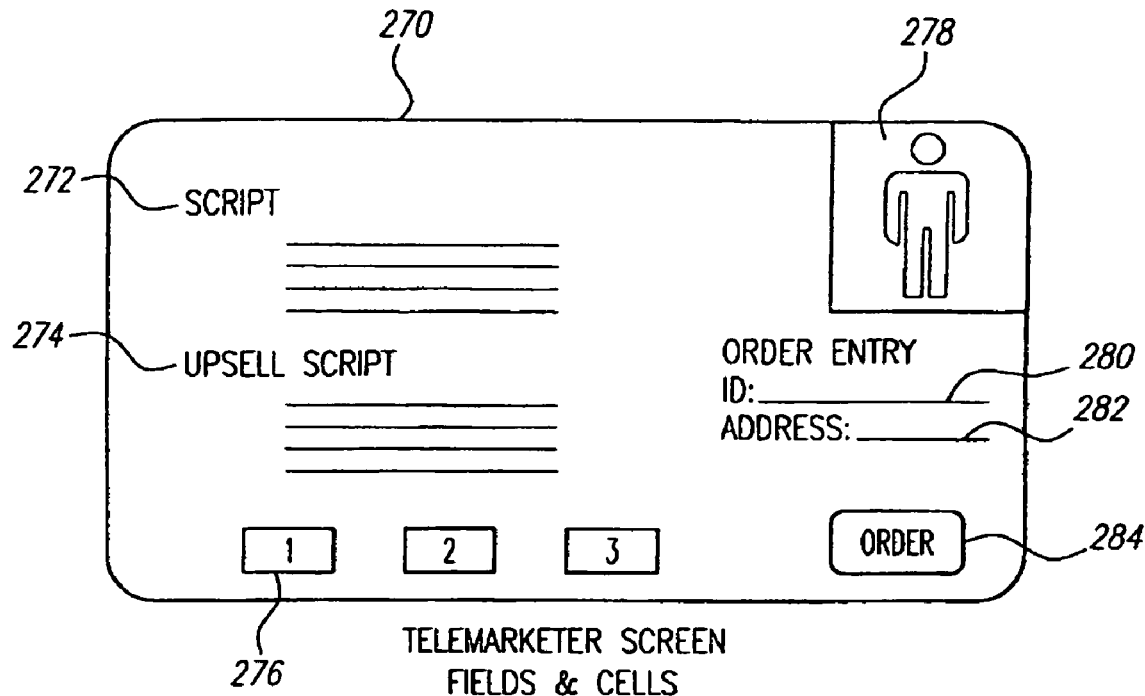
FIG. 8 shows a representative screen display for a telemarketing operator.

The third main component of the upsell consists of the actual offer 350 of the upsell to the user. In the event of a telemarketing upsell offer, the typical mode would include a display on the telemarketers screen of various script or product information 354, which is then provided to the caller. FIG. 8 shows a representative screen for a telemarketer display. The display 270 may include script 272 for use by the telemarketer for interaction with the caller. Specific upsell scripts 274 may be provided, either as a single option for the telemarketer, or to provide multiple options for selection by the telemarketer. Soft keys or icons 276 provide for selective identification of entry by the telemarketer. Various text or numeric based fields 280, 282 may be provided for entry of information, such as order entry, and specifically including identification data 280 and address data 282. This data may be initially provided automatically from the system, for possible confirmation by the telemarketer, or may be initially input by the telemarketer. Optionally, if image information is provided during the transaction, image 278 may be depicted on the display 270. By way of example, if a video phone system is utilized, the image of the caller may be displayed. Additionally, or alternatively, if image or video is provided from the telemarketer to the customer, those images may also appear on the telemarketer's screen 270 in region 278 to provide the telemarketer the same (though possibly in reduced size such as a picture-in-picture) which is simultaneously being provided to the customer. An order entry icon, tab or button bar 284 may be utilized.

By way of further example, the offer may be presented to the user by modes of communication other than those utilized for the primary transaction. For example, if the primary transaction is conducted by telephone, the upsell offer may be presented by a wireless device such as a personal digital assistant (PDA), cellular/wireless telephone, or other device. As another example, if the primary transaction is conducted by an internet web connection, television/internet connection, interactive television, or similar mode, the upsell offer may be presented by telephone. All other combinations of modes of communication are also possible, including e-mail, facsimile, cable contact, and others that are described herein or otherwise known in the art.

The mode or manner of the offer 352 to the customer may also be varied. The customer's prior history or a determined optimum mode or manner of offer based upon customer designation may be utilized. Certain customers or customer designations may be best offered the upsell in a business-like, straight-forward manner, e.g., "We have a special offer for you today . . . ". Other potential customers who have manifested less than an eagerness to be upsold in the past may be initially addressed with a message of an apologetic tone, e.g., "I know you to not typically consider other times, but we have something that we think you will find worth your time to consider . . . ". Yet other presentations may be in a more elaborate or flowery manner, such as in the addition of music, other audio, images, video. The coded designators, or other data regarding the user, may be used in determining the mode or manner of the offer.

If the upsell is consummated 356, the order may be confirmed. That confirmation may be printed, if desired. Further, the customer may be provided with a confirmation number. If a shipping/tracking unit 364 is utilized, the tracking information, and the mode of accessing that system, may be provided to the customer. In the event the upsell offer is not consummated, the user may be offered an alternative upsell 358. The alternative upsell may be determined before the initial upsell, or may be recomputed, wherein one of the inputs to the determination system includes the negative result from the first upsell offer. Optionally, the customer may be queried regarding their reaction, either positive or negative, with respect to the initial upsell offer, so as to provide yet further specific inputs to the upsell determination system.

The system may be modified over time. For example, the success of prior upsells of specific items may be further incorporated in the decision as to the upsell offers 370. This modification of the rules over time may be either done in real time, or on a periodic basis, such as in a batch mode. Further, the system may receive data from users after the receipt and use of their obtained goods or services, such as wherein the customer satisfaction with the goods and services is then incorporated in the decision criteria for the upsell offer.

Figure 7:
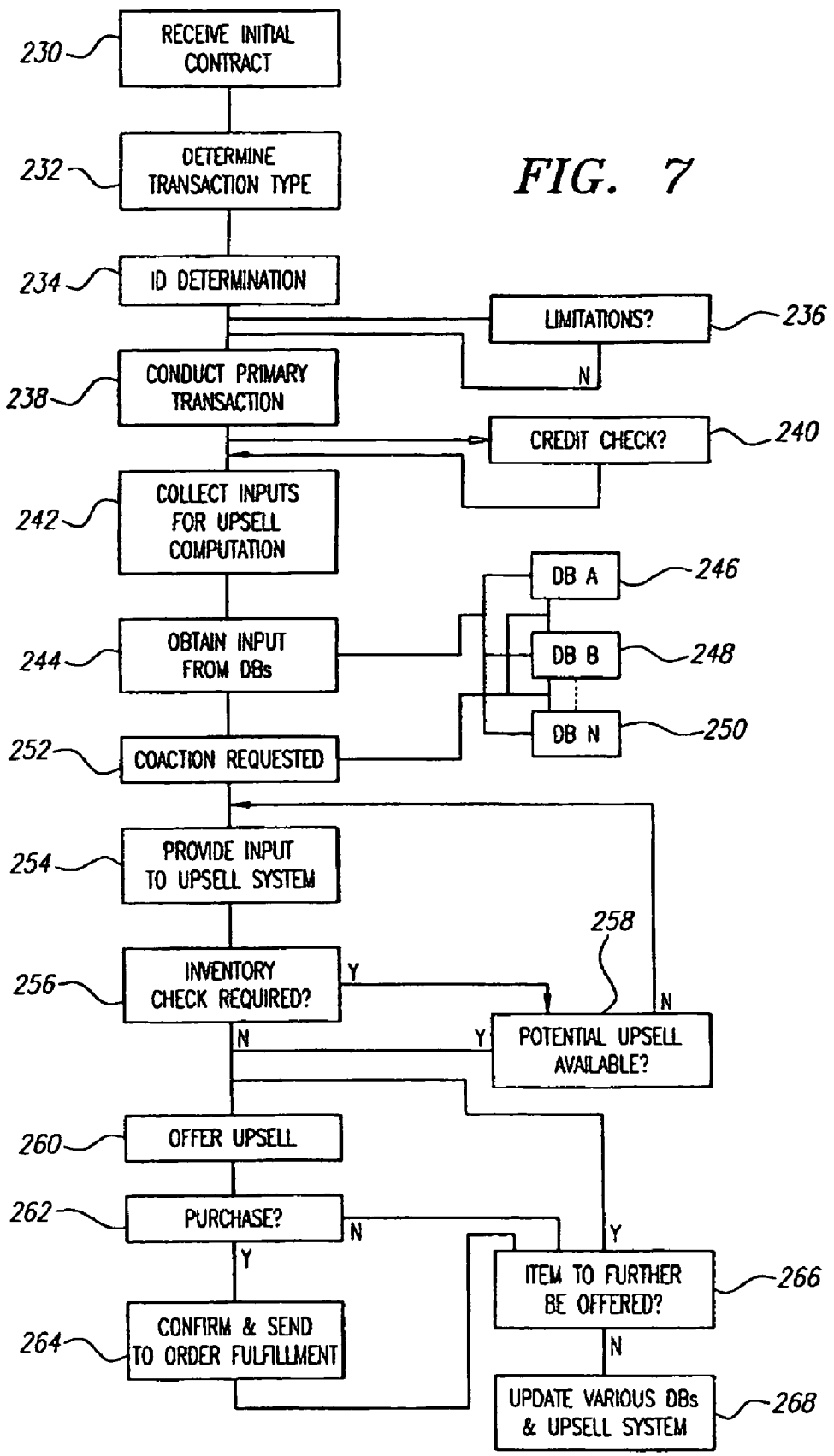
FIG. 7 is a detailed flowchart for one implementation of the methods of these inventions.

FIG. 7 shows a flowchart for one possible path through the system. Upon receiving an initial contact 230, the transaction type may be determined at step 232. Various identification determinations 234 may be collected and then used in determining whether any limitations 236 are to be applied, which if not, the transaction may then be conducted at step 238. Optionally, a credit check 240 may be performed, either for the primary transaction alone, or further, for a potential upsell. The inputs having been collected 242 from prior interaction, database checks 244 may contact and interact with database A 246, database B 248, . . . database N 250, possibly under control when coaction 252 is required. The inputs having been collected are then provided 254 to the system. Optional inventory checks 256 may be performed and then utilized step 258 to determine if the potential upsell item is available. Once the upsell has been determined, the upsell may be offered in step 260, which if purchased at step 262 may then be confirmed and sent to order fulfillment step 264. Optionally, further items may be offered, step 266, in which case the upsell determination may be repeated, or the previously determined second upsell item offered. Typically at the end of the transaction, at step 268 the system will update various databases as appropriate and the upsell system, including the criteria for determining the upsell.

In the offering mode of the website, one variation may include the ability to transfer from the website to a live operator. Such a transfer may be useful wherein the potential customer is interested in obtaining further information regarding the offered product, or has queries which cannot easily be addressed in a web or electronic commerce context. As described in connection with the telemarketing screen, FIG. 8, the screen for the electronic commerce applications may include a display of the live operator, and may also include a display on the live operator console of the customer, if desired.

With regard to the billing system, in one aspect of this invention, it is possible to allocate billing 368 for use of the system. For example, if the primary transaction is financed by company A, and an upsell in the economic interest of company B is successfully effected, piggy-backing on the primary transaction of company A, an accord or allocation may be made between company B and company A regarding payment for the services. Typically, company B would make a contribution to company A, or in some manner reduce the cost for company A to conduct the primary transaction. Consistent with the allocation of expenses between two or more companies, it should be expressly noted that in the upsell system of this invention, the goods or services offered may come from independent sources. That is, the primary transaction may relate to a good or service from company A, and the upsell relate to a good or service from company B, where company A is unaffiliated with company B.

Figure 9:
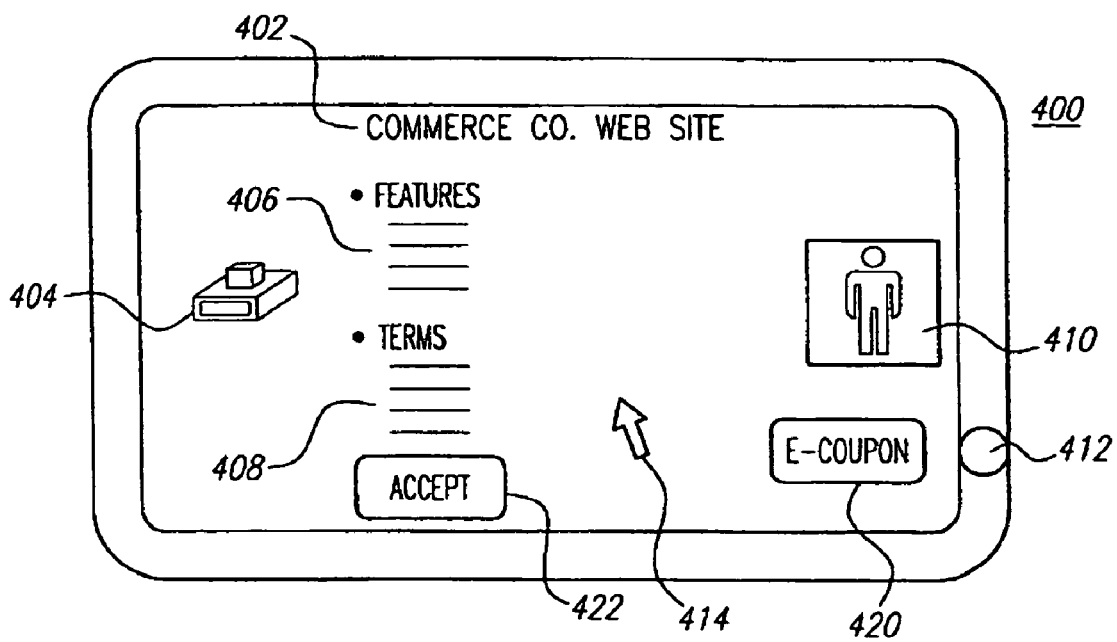
FIG. 9 shows an exemplary display for a Internet-based display.

FIG. 9 shows a highly simplified depiction of a display such as used in one implementation of a electronic commerce application utilizing the inventions of this system. The overall display 400 may include textual information 402 identifying the affiliation of the provider of the good or service. A graphical depiction 404 of the good or service may be provided, which is either a still image or includes motion. Information regarding features 406 may be provided as well as may be the terms 408 of sale, lease or other interchange. Optionally, a display 410 provides a video feed such as from a telemarketing or other operator assisting the user, or provides a created image regarding a assistant for the transaction. Speakers 412 may be optionally utilized to provide audio information, either being one-way communication or two-way communication. Typically, some sort of a pointer 414 is displayed on screen 400 to designate the area of data for entry. For example, an acceptance 422 region may be clicked, or double clicked as required, to accept an offer. Optionally, an electronic coupon 420 or other form of coupon may be provided to the user in a real time manner for later use. The coupon may be for a discount on a later purchase, or may otherwise be a form of incentive to the customer, such as the award of credits which may be accumulated for exchange into other goods or services.

Figure 10:
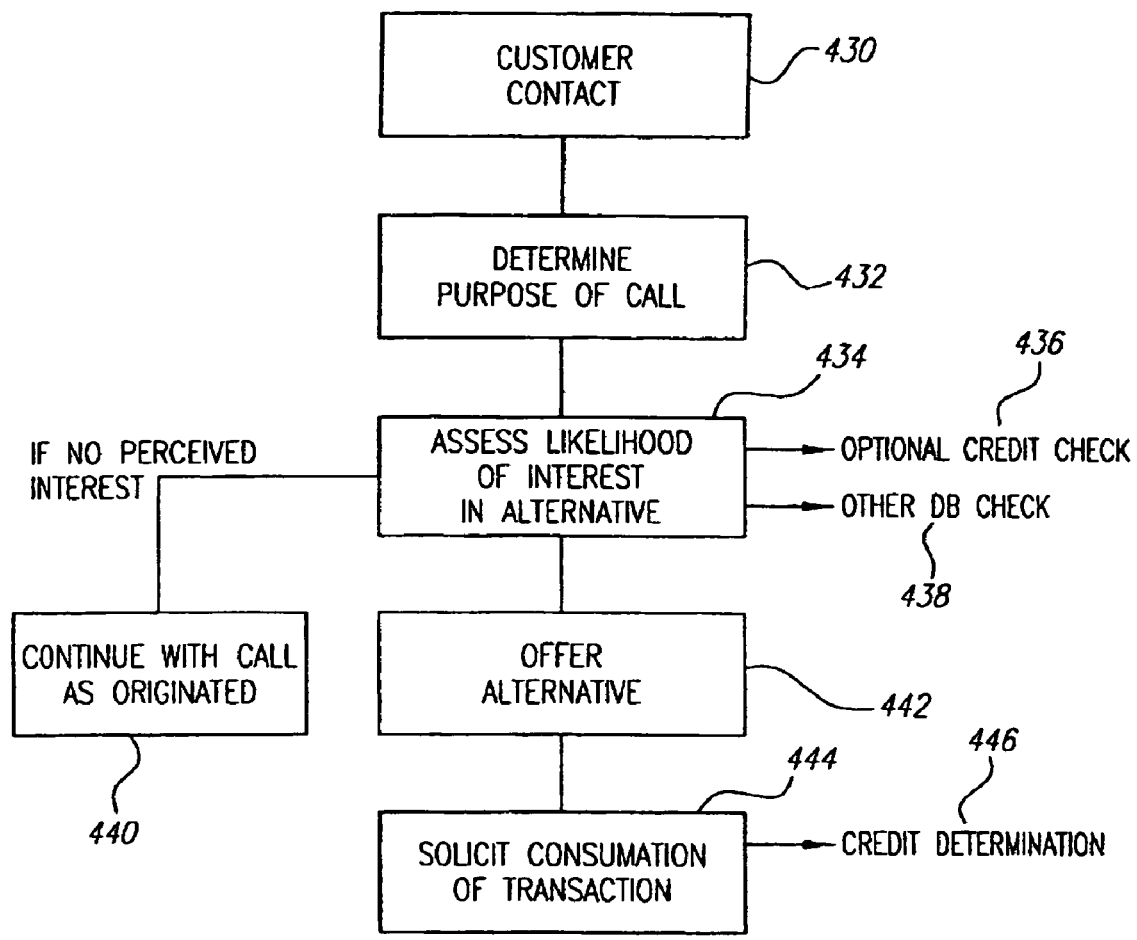
FIG. 10 shows a flowchart for a customer service application.

FIG. 10 shows a high level flowchart for a customer service operation. Upon customer contact 430, the purpose of the call 432 may be determined. The purpose may be determined such as from knowledge of DNIS as indicating a customer service number, or by response by the customer to queries, such as from a live operator or interactive voice response system (e.g., press 1 for purchase, press 2 for service . . . ). Decision block 434 optionally provides a preliminary assessment of the likelihood of interest in an upsell or alternative presentation. In the event an offer is to be made, checks such as a credit check 436 or other database check 438 may be made. The input data is then provided to a processing, upsell system (as described previously) from which an alternative 442 may be generated and offered. The system may optionally then solicit consummation of the transaction 444, and may, if required, again access for credit determination 446. In the event that it is perceived at decision block 434 that no interest exists in an upsell, the system may continue with the call as originated 440. By way of example, assume that a user calls a service number regarding an integrated cellular phone and paging system. The system may obtain the ANI (or mobile identification number) and determine based upon the DNIS that a particular customer is calling a service number. After optionally confirming that the call relates to the repair of the phone/pager associated with the ANI or MIN, the system may determine that this product is sufficiently old that an upsell should be offered for a replacement item. By accessing a database, such as the cellular systems local database, it may be determined that the caller has a now supplanted model of phone, and possesses sufficient credit worthiness to purchase a new system. At that point, the system may offer the caller a purchase option for the replacement item, thereby effecting an upsell from one transaction type, namely, a service contact, into a separate type of transaction, such as a purchase transaction of a replacement or superior item. In this way, an upsell is effected.

FIG. 11 shows a perspective view of a wireless system which utilizes position information in a potential upsell or intelligent information selection application. A wireless unit may be operated by a user, shown within the automobile. The wireless device communicates with an antenna. The signal from the wireless unit sends identification information, such as a mobile identification number (MIN). Additionally, position information such as from a GPS receiver may be provided. Combined cellular and GPS systems may be utilized. Yet other position detection systems may be utilized, such as triangulation based systems. As shown, a billboard may provide advertisement information and prompt the caller to dial a telephone number or code, e.g., *72, for further information. A response to the inquiry may utilize the identification information, such as the MIN, as described within this application and utilize that information to intelligently select a good, service or other information for presentation to the user. By way of example, certain vehicles are currently equipped with systems which place an outgoing wireless call to a service, but also provide position information regarding the caller. One such system is the OnStar system which may be activated either by the caller depressing a button which causes the preprogrammed dialing of the number corresponding to the service, as well as to provide geographic GPS information. Alternatively, the system is designed to automatically call the service in the event of an accident, such as would be indicated by the deployment of a safety system, such as the airbags deploying. Such a contact to a service identifies both the calling vehicle (e.g., through use of the MIN) plus provides geography information, and optionally, provides information regarding the status of the call, e.g., was the call initiated by the caller or automatically activated because of a safety based call. Some or all of that information may be utilized in a automated system, with or without the additional use of live operators, to select information, goods or services for presentation to the potential customer. For example, if the call were automatically initiated because of airbag deployment, the system could utilize that information, optionally with other information keyed to the identity of the user, such as hotel preferences to select an offer a hotel based upon the assumption that they would reside in that geography for the night. Rather than merely providing a recommendation untailored to the particular caller, the use of the identification information coupled with knowledge about that caller and their circumstance may lead to a better selection of good, service or information.

Considering wireless devices more broadly, a customer utilizing a wireless device, such as a cellular phone, Palm Pilot VII, or other wireless communication or web access device, may provide geographic position information regarding the user of the system. That information may be obtained via global positioning satellite (GPS) information, or may be taken from a knowledge of the base station position. In the wired domain, the geographic position information may be obtained at various levels of granularity, such as through the use of area code information, or more specifically, exchange information, or yet even more particularly, through the use of various databases which map telephone numbers to specific geographies, such as a caller's street address. The geographic position of the user may be determined via an access point to a system, such as where a customer utilizes an automated teller machine (ATM) on a network. The geographic position of the user is known based upon their interaction with the network. By way of example, a person accessing an ATM network is identified by information read from the magnetic strip of the bankcard (or provided by a smart card type technology). The identification is of both the customer and of their bank. The bank knows the geographic location of the ATM. From this information, it may be inferred that the customer is outside of their ordinary geography, and presumptively on a trip. In certain circumstances, it may be safe to assume that the user is on vacation, such as where the ATM is located at a resort location or entertainment facility. That information may be utilized by an intelligent system to provide goods, service or information to the user, such as to provide coupons to the ATM user for a free children's meal.

The geographic information may be utilized in combination with other information in determining an offer or upsell. By way of example, the system may know the position of a potential user of a good or service based upon position information from a GPS system, and may utilize that information in offering a good or service, such as a discount coupon, at a geographically local store. Such an offer may be made as the result of a caller contacting the system, or may be provided in an outbound or push based context where the system contacts the potential user of the offer, such as by calling their cellular phone or other wireless device. The geographic position information may additionally be combined with data or information regarding the geography of the person. For example, if the positional information indicates that the person is in a casino at midnight, it may be a valid assumption to assume that the person is not risk averse.

Figure 12:
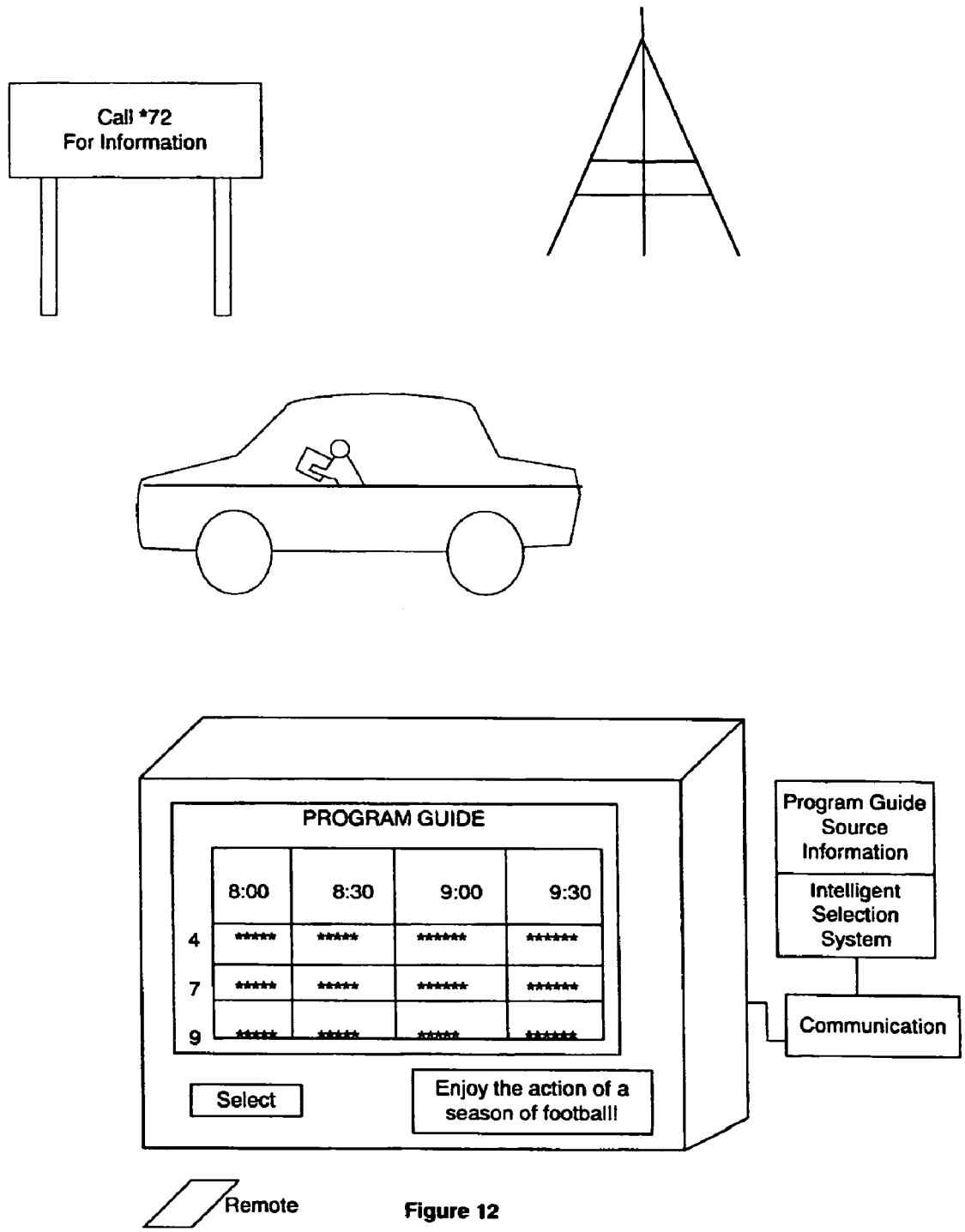
FIG. 12 shows a plan view of a possible on-screen programming guide in conjunction with an upsell determination.

FIG. 12 shows a on-screen programming guide on a display and a input device, such as a remote control. The on-screen programming guide typically includes a display as a function of time and channel. Ordinarily, the program guide displays programming from the current time forward for a number of hours. Channel information is displayed either simultaneously or in a scrolling manner. Within the contemplation of this system, the on-screen programming guide may provide input information into the decision system, such as by receiving an indication of a program which is selected, or is being considered. The user input device, such as the remote control, may provide position control of a cursor or other marker on the on-screen display. Alternatively, direct entry of data by the user on the pad of the remote control, or from a more fully functional keyboard may be utilized. Preferably, infrared communication between the remote control and the television or display including the on-screen programming guide is utilized.

By way of example, if a viewer selects a Pay-Per-View sports event, that selection may be used as an input to the system as described generally in this application which then results in the selection and offer of another good, service or set of information for the potential customer. Continuing with the example of an order for a Pay-Per-View sporting event, the system may determine, through the various methods described herein, to offer the viewer a series of entertainment events, such as a seasonal football schedule. The input device for such an onscreen programming guide application in the upsell context could be a remote control operated by the viewer.

ADDITIONAL EMBODIMENTS

Figure 13:
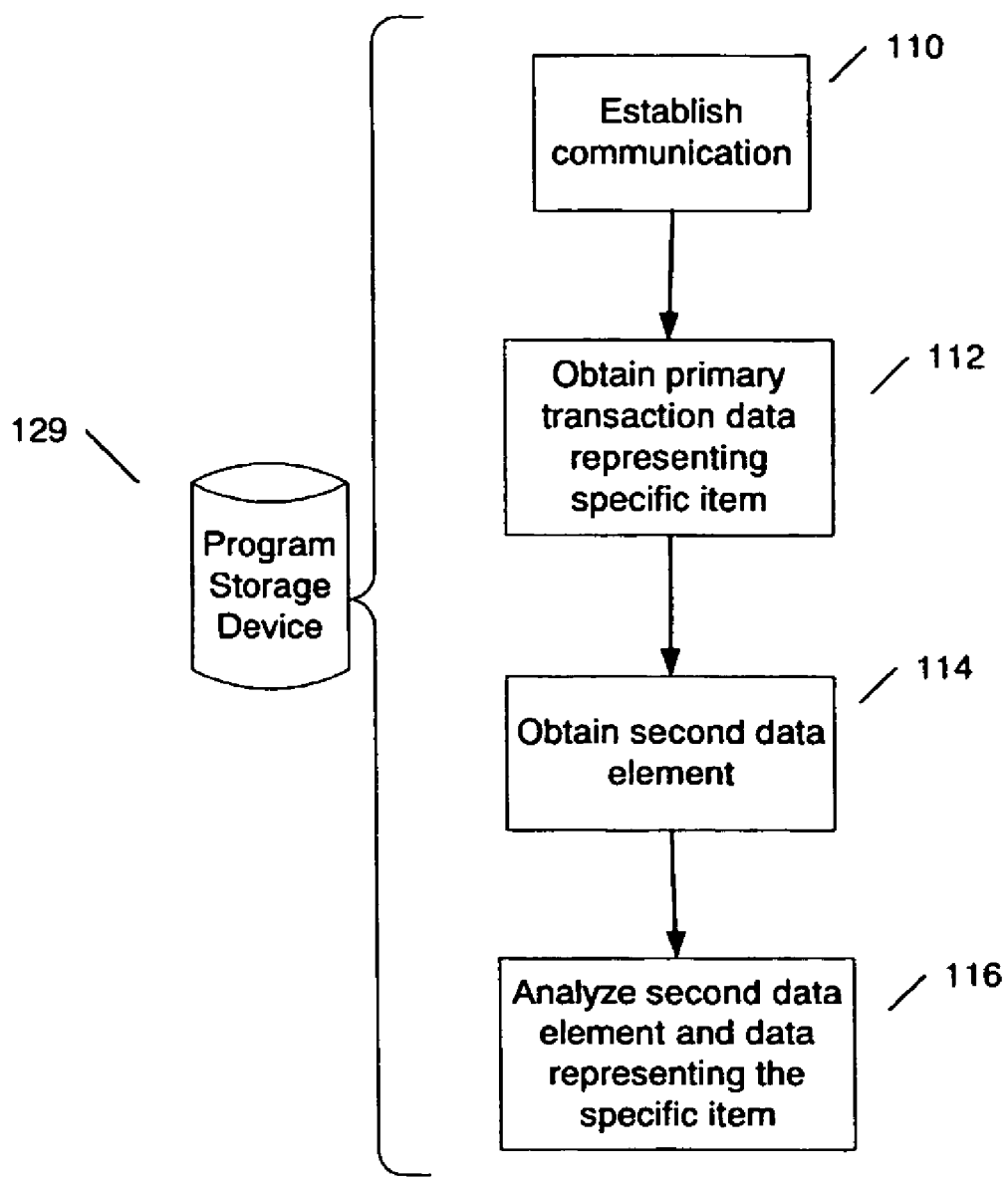
FIG. 13 is a flowchart illustrating processing performed by another embodiment of the invention.

According to various embodiments of the invention, the method can comprise at least the following steps, summarized in FIG. 13, which is a flowchart illustrating an example process flow provided by the invention. Communication is established via the communications device between the user and the system to facilitate a primary transaction involving at least one specific item selected by the user (block 110). Primary transaction data relating to the primary transaction is obtained, with the primary transaction data including data representing an identity of the user and the item involved in the primary transaction (block 112). At least a second data element relating to the user is obtained using the data representing the identity of the user (block 114). The method then analyzes the second data element and the data representing the specific item to determine whether to offer upsell transactions to the user (block 116).

Figure 14:
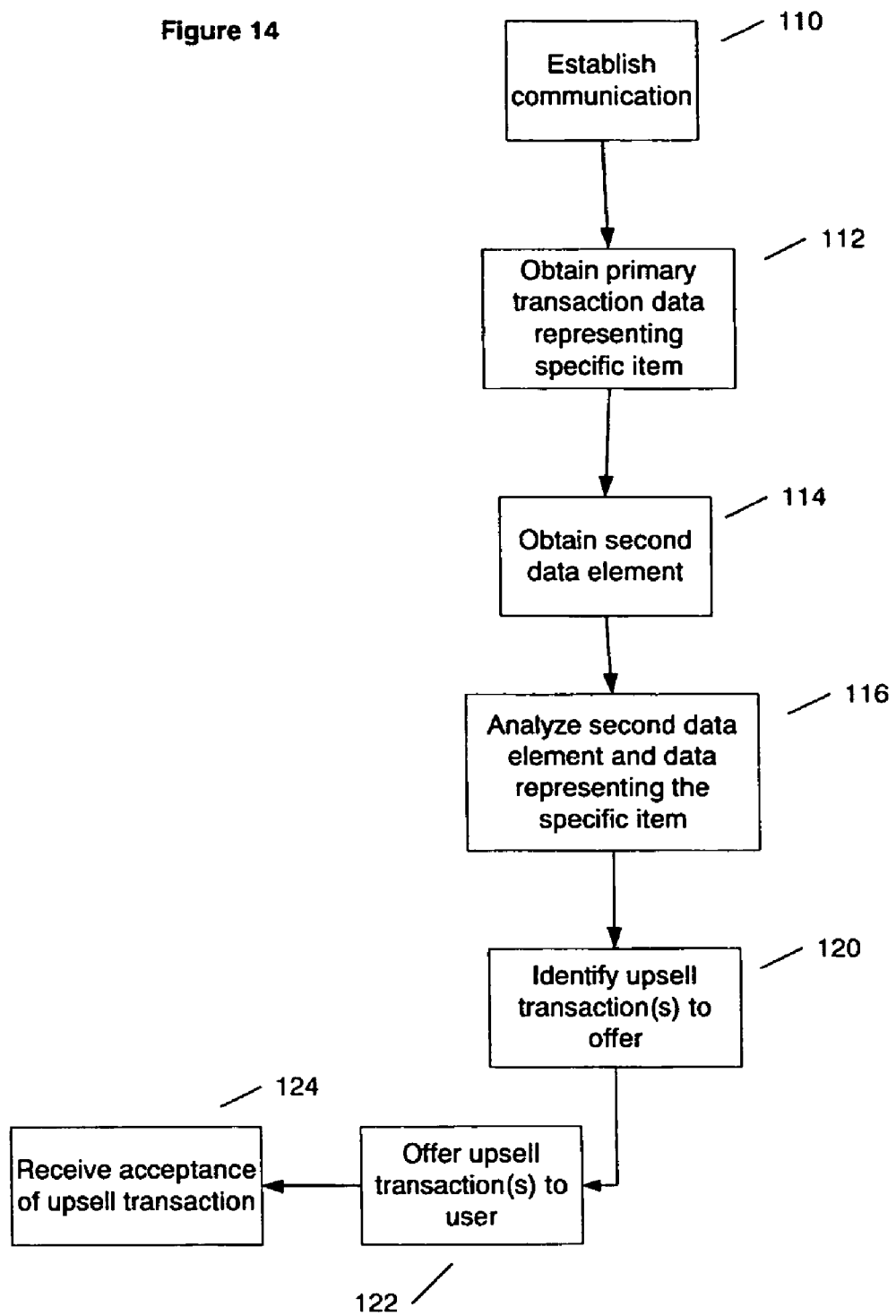
FIG. 14 is a flowchart illustrating additional, optimal processing that the invention can perform.

FIG. 14 is a flowchart illustrating additional, optimal processing that the invention can perform. According to additional embodiments of the invention, the method can also include the number of upsell transactions to offer to the user is identified using at least the data representing the item and the second data element if upsells are to be offered to the user, the method can include identifying at least one specific upsell transaction to offer the user, with the identification process using at least the data representing the item and the second data element as input (block 120). The upsell transaction can then be offered to the user, either in an appropriate electronic format or by verbal presentation by a human agent (block 122). The offered upsell transaction can then be accepted or declined by the user (block 124).

The method can include identifying any number of specific upsell transactions to offer the user, including zero upsell transactions. For example, an analysis of the second data element and the identity of the user may reveal that no possible upsell transaction has a reasonably good probability of being accepted, and that the most prudent course for a given user currently conducting a given primary transaction is not to offer any upsell transaction at all. For example, the cost of proceeding with the upsell transaction may exceed the profit or return expected from offering the upsell transaction. More specifically, if the probability of the upsell being accepted times the expected profit of the upsell is less than the cost of offering the upsell, (connect time, agent processing time, etc.) then the upsell may be a losing proposition and not worth offering. In other embodiments of the invention, the method can include identifying one or more specific upsell transactions to offer to the user. Those skilled in the art will thus recognize that the processing represented by blocks 120, 122, and 124 may or may not be performed in each transaction processed by the invention.

Figure 15:
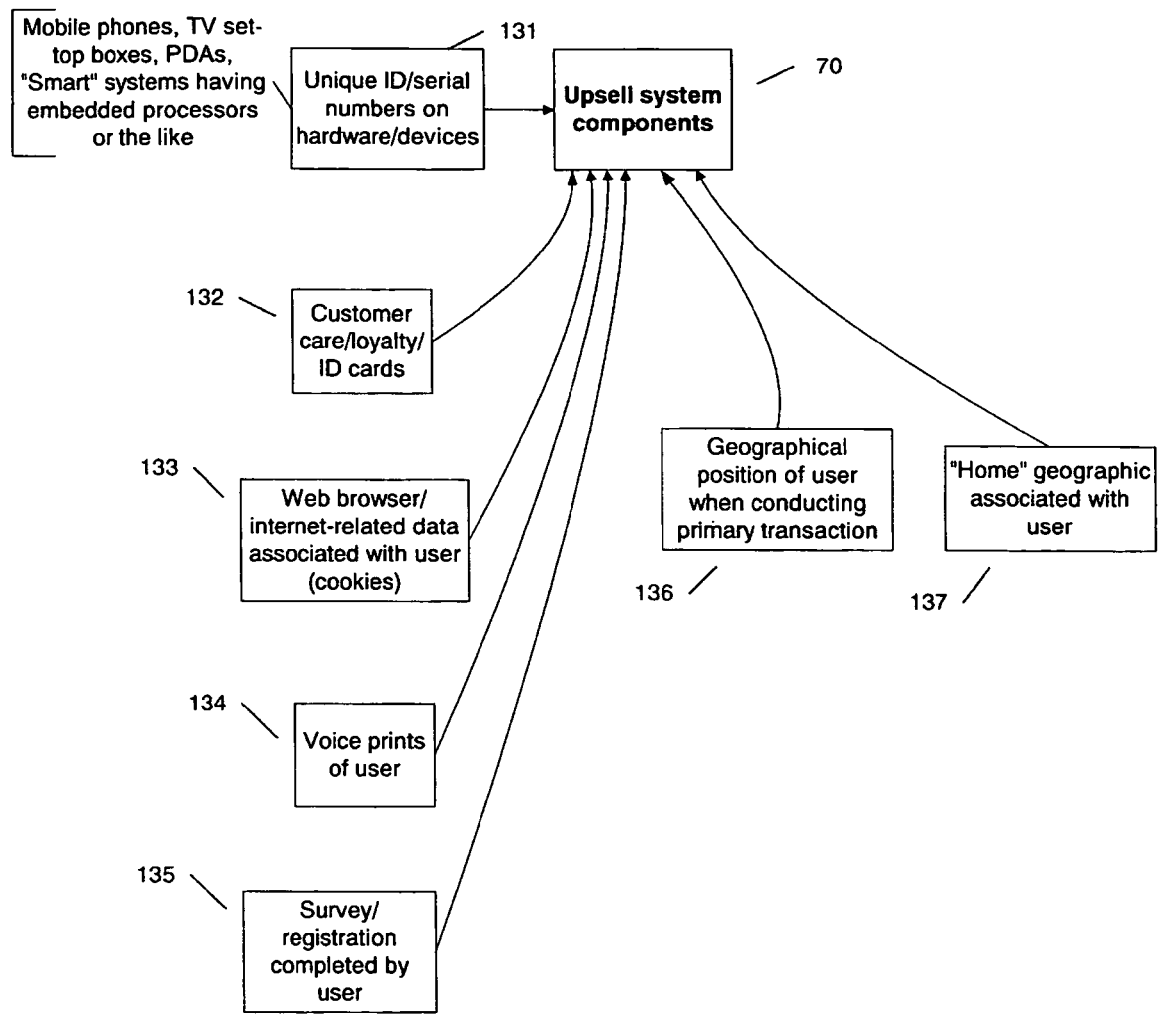
FIG. 15 is a block diagram illustrating the sources of various inputs to the upsell system.

FIG. 15 is a block diagram illustrating the sources of various inputs to the upsell system components 70. The method can obtain the primary transaction data by obtaining at least one identifier that uniquely identifies the user, for example, by obtaining a voice print or other biometric data associated with the user and using this voice print or biometric data to establish the identity of the user (block 134). In the voice print example, the user's voice print can be analyzed using known speech recognition software to build a model of the user's voice, with this model serving as an index used to access a database of previously stored voice models associated with various users. A voice print corresponding to the given user can be located, for example, by comparing the voice print to voice prints in the database, and accessing the second data element based upon that comparison. Once the user's identity is established, the method can obtain the second data element using the voice print, with the second data element being, for example, data representing the user's previous purchases and behavior.

To facilitate the method of the invention, the identity of the user must be determined in order to obtain information related to that specific user or to obtain modeling information derived from similarly situated users. Accordingly, in other embodiments of the invention, obtaining the primary transaction data can include obtaining a unique identifier related to the specific communications device or hardware associated with the user (block 131). For example, the method might obtain a unique identifier for a wireless device used by the user to conduct remote commerce, such as a unique serial number associated with a particular cellular phone. Example devices may including at least one of the following: a set-top television box, a remote control used in conjunction with such a set-top box or with the television itself without a set-top box, a wireless telephone, or a personal digital assistant coupled and enabled to communicate over a wireless network. Other examples of hardware suitable for conducting and/or transmitting upsell transactions include devices operating under the Short Message Service (SMS) standard, which enables users to exchange short alphanumeric messages over devices such as pages, mobile phones, PDAs, or the like. These embodiments are discussed in more detail below.

In other embodiments of the method, obtaining primary transaction data can include customer identification number from a tangible item presented by the user when conducting the primary transaction (block 132). For example, the method might obtain primary transaction data by accessing data from a physical card presented by the user at a kiosk or check-out counter in a retail environment, such as a grocery store, home improvement warehouse, or other types of commercial environments. Common examples of suitable cards are customer loyalty, identification (ID), or customer care cards issued to selected customers by stores, which cards may store customer-specific data in the form of magnetic strips or bar codes, which may in turn be scanned-in at the kiosk or check-out counter using optical or other suitable equipment. Once the customer is identified using this data, the customer's identity may be used as at least part of the input to the upsell determination process. The customer can then be offered upsells through the kiosk or other equipment, preferably in real time with the primary transaction.

Further embodiments of the method obtain the primary transaction data by processing files residing on the user's computer system and being associated with web browser or other software running or residing on the computer system (block 133). Such files are commonly referred to as "cookies" in the art, and typically store data associated with the user in text or other formats. The files can be used to obtain either the primary transaction data or the second data element used as inputs to the upsell determination process. Specifically, the files may contain information directly identifying the user, or the files may contain click-stream data or other browser history data identifying those web sites visited by the user. Also, the user's login/password information may be stored on the system, which information can in turn be processed if necessary as input to the upsell system components 70. This click-stream or history data may indicate areas of interest to the user, and analysis of this data may help guide the upsell determination process toward one or more optimum upsell offers.

Elaborating further on the embodiments mentioned above regarding set-top television boxes (shown as part of block 131), various aspects of the method contemplate establishing communication with the user via hardware adapted to process television signals from a network and converting them into a format suitable for viewing by the user. Common examples of such hardware might include converters, decoders, de-scramblers, or other hardware having similar functionality that may be used with broadcast, cable, or satellite-based communications systems, including for example television systems. Other embodiments of the invention include such hardware that is separately and uniquely addressable. For example, known addressable converters enable cable television subscribers to view pay-per-view events transmitted over the cable television network. After the subscriber has paid the fee to view the event, the network can send a signal to the subscriber's uniquely addressable converter that enables the viewer to watch the event.

The instant invention can be extended to operate in the above context by capitalizing on the ability of such uniquely-addressable hardware to identify the subscriber/user, while also supporting the capture and tracking of viewing habits and other behavior of the subscriber/user. For example, the user may conduct the primary transaction via the satellite, cable, or interactive television network, rather than the telephone-based embodiments described elsewhere. In this application of the invention, the method could identify the user by determining the identity of the uniquely-addressable hardware that the subscriber/user is using to conduct the transaction. For example, the network may associate a unique serial number or other identifier corresponding to each uniquely-addressable hardware item distributed to receptive subscribers. By accessing this serial number or other unique identifier as stored by the network, the method can identify the user corresponding to this identifier without requiring the user to identify himself/herself. Once obtained in this manner, the identity of the user can be fed as input to the upsell determination process in the same manner as discussed elsewhere in the instant application. The identifier associated with the set-top box can also be used to obtain the second data element used as further input to the upsell determination process. The upsell transaction identified by the upsell determination process for offer can then be presented to the user via a network, for example, a satellite television network, and the user can accept the offered upsell transaction using the same network.

In this embodiment of the invention, the user can conduct one or more primary transactions via the television network, with the method operating to recommend appropriate upsell transactions to the user. The term "primary transaction" as used in the context of this application will be understood to include but not be limited to the following types of activities conducted using the television network: purchases of goods and/or services; viewing of television shows, events, movies, "infomercials," or other subject matter; playing of interactive games or other forms entertainment supported by the television network; or inquiries about good and/or services advertised or otherwise featured via the television network. In addition to the definition of "upsell" given above, the term "upsell transaction" will be understood to include, but not be limited to, the following activities that may be related in some manner to the subject matter of the primary transaction: offers to purchase or otherwise obtain goods and services; suggestions, offers, and/or discounts related to viewing television shows and/or movies; offers to apply for credit card accounts or other financial instruments; or coupons, promotions, or other advertisements targeted based on the user's identity, viewing habits, and past behavior.

For example, a user may inquire about or order memorabilia associated with the American Civil War via a television network after viewing an advertisement or infomercial relating to that subject matter. The method could then operate to recommend a movie, documentary, or other television show relating to history in general, or to the American Civil War in particular. As another example, the above scenario may play out in reverse: the viewer may watch a historical documentary, and in turn the method may identify and offer an advertisement or discount relating to the subject matter of the documentary. As yet another example, the user may use an interactive television service to order a movie or pay-per-view event for viewing, and the method may then identify and offer a promotion or discount coupon for a local pizza delivery service. Those skilled in the art will recognize that these examples serve merely to illustrate various aspects of the invention, but do not limit the scope of possible applications for the invention as described herein.

Various aspects of the invention also contemplate using internet-based communication technologies such as e-mail, or messaging technologies supported by web browsers, such as the Instant Messenger™ technology offered by ICQ.com, America OnLine, Inc. (www.aol.com) and others. Specifically, the method can include offering the upsell transaction using browser-based messenger technology, and receiving an acceptance from the user using browser-based messenger technology. This messenger technology can be implemented using any suitable technology, such as SMS, person-to-person networking protocols, IP networking, or the like.

As noted above, the method can include generating zero or more possible upsell transaction for offer to the user. Along these same lines, various aspects of the method can also include selecting zero or more of the generated upsell transactions to offer to the user. This selection process can be done by either an automated process or by a live human operator, either of which can in turn present the selected upsell transaction(s) to the user.

Various aspects of the method include obtaining the second data element used as part of the input to the upsell determination process from a variety of sources, including obtaining information related to a survey taken by the user, or a registration completed by the user (block 135). The method can analyze the survey responses or the registration information as the second data element related to the user for the purposes of determining what, if any, upsell transaction(s) to offer to the user. The terms "survey" and "registration" as used herein refer to any information provided by the user in response to an interactive question-and-answer questionnaire or any other type of information-gathering method utilized by a merchant or other information-gathering entity. Common, but non-limiting, examples might include warranty registration cards that are completed and returned by the user after purchasing consumer goods at retail outlets, bridal or other types of gift registries established to facilitate or organize gift-giving related to certain occasions, or electronic or internet-based versions of the above. Surveys or registrations that gather information related to factors such as user's demographic profile, financial/employment data, outside interests or the like, may be particularly useful for providing the second data element used in the upsell determination process, which in turn can identify the upsell transaction(s) to be offered the user by analyzing data provided by the user when completing the survey or registration.

Figure 16:
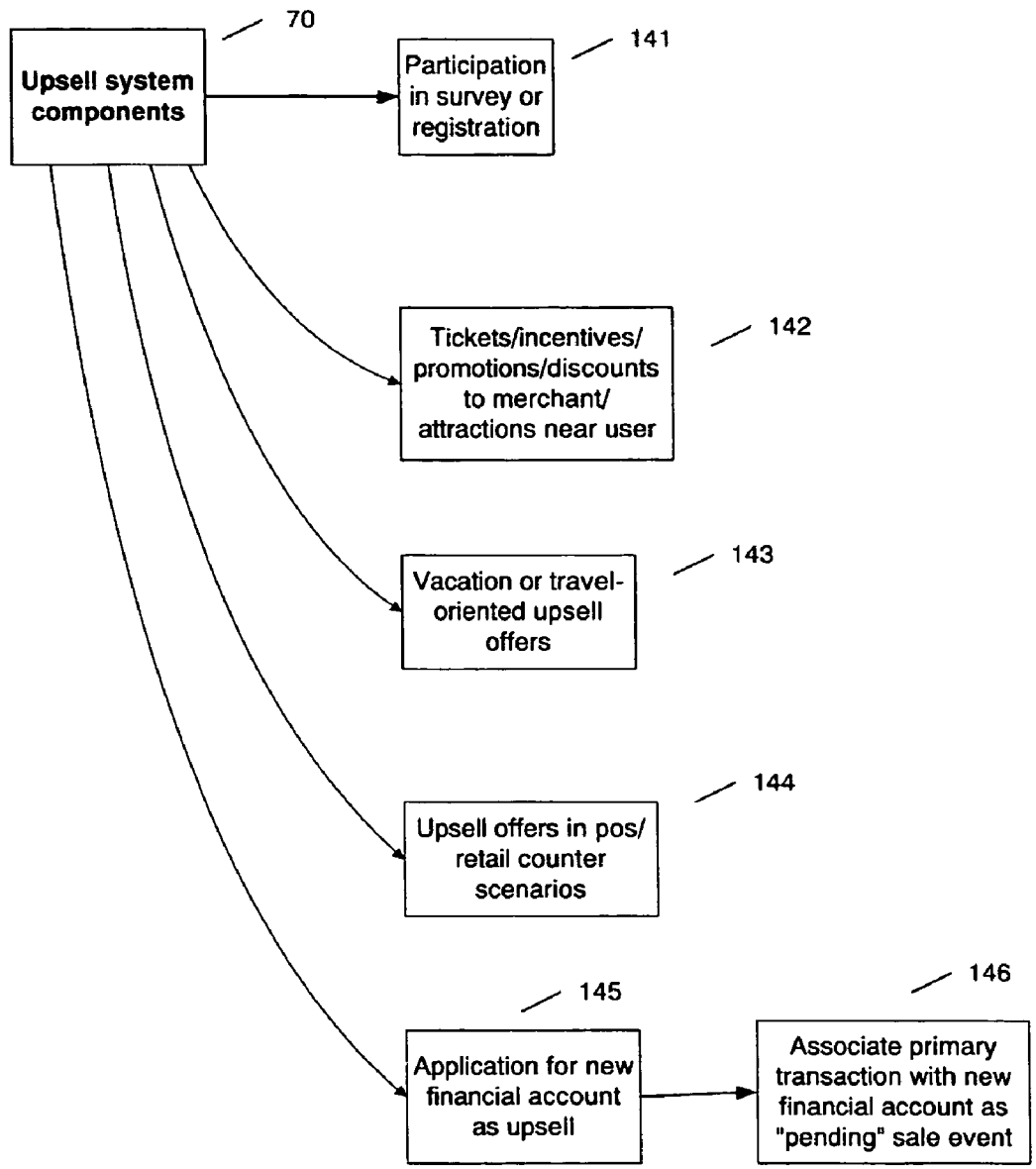
FIG. 16 is a block diagram illustrating several examples of inputs to the upsell system.

Turning briefly to FIG. 16, a block diagram illustrating several non-limiting examples of various outputs generated by the upsell system components 70, in other embodiments of the invention, the method can include offering the user as an upsell transaction an opportunity to participate in a survey or to complete a registration of some type, possibly in exchange for an incentive to be received by the user (block 141). The entity receiving the information resulting from the survey or registration may provide the incentive to the user, either directly or through an intermediary.

Returning to FIG. 15, other embodiments of the invention consider the geographic location of the user when determining which, if any upsell transaction(s) to offer the user (block 136). In these embodiments, obtaining the indexing data includes at least in part obtaining the geographic location from which the user is conducting the primary transaction. For example, where the user is dialing a call center on a Public Switched Telephone Network (PSTN) or a wireless network, the number of the handset from which the caller is originating the call can be made available using known ANI technology, or variations on this technology as appropriate to support wireless callers. The originating telephone number can then be run against known databases, including but not limited to those available from Targusinfo (www.targusinfo.com) to identify a geographic location corresponding to that originating telephone number. As another example, if the user is using a set-top television box to conduct the primary transaction, the physical location of the box itself can be obtained, typically via the network connecting the box to the entity with which the user is transacting. For wireless callers using mobile handsets or calling from vehicle-based originating sets (for example, the OnStar™ system offered by General Motors and other automobile manufacturers), the satellite communications network supporting such calls can often pinpoint the caller's approximate, and possibly exact, physical location as the call progresses.

Referring to FIG. 16, once the location of the user is established, offering the upsell transaction can include offering the user tickets, discounts, coupons, or promotions related to merchants or events based upon or near the user's geographic location (block 142). As non-limiting examples, the merchants or events can include theaters, concerts, sporting events, stores, restaurants, or the like.

Other embodiments of the invention may find application in the context of Automated Teller Machines (ATMs). In these embodiments, the user establishes communication with the system via a banking/financial network, thereby enabling the user to conduct, as the primary transaction, a financial transaction (withdrawal, deposit, balance inquiry, etc.) at an ATM machine located at the user's geographic location. The method then can offer an upsell transaction based on the geographic location of the user when accessing the ATM. In additional embodiments, the method of identifying the upsell transaction can include determining that the geographic location of the user when accessing the ATM is different than a "home" location associated with the user (block 137 of FIG. 15). This circumstance may suggest that the user is on vacation or holiday, or is on a business trip, and the method can factor-in this circumstance when offering the upsell transaction (block 143 in FIG. 16). For example, the offered upsell transaction may be more related to tourist or travel activities than if the user were closer to his/her home location, and for example, may be more directed to tourist attractions, travel discounts, lodging, entertainment, local events, or the like. The method can, but does not necessarily, facilitate operation of these embodiments of the invention by a business relationship with chambers-of-commerce or similar organizations in the area local to the ATM accessed by the user.

Other embodiments of the invention include establishing communication via a first communications medium to conduct the primary transaction and offering the upsell transaction via a second communication medium that is different from the first communication medium. As a non-limiting example, the method can enable the user to establish communication with the system via an internet web page to conduct the primary transaction, and can offer the upsell transaction by sending data or signals representing the upsell transaction via a wireless communications network to a handheld device associated with the user. More generally, the method can include establishing communication and conducting the primary transaction via a first communications network, and then offering the upsell transaction via a second communications network.

Referring to block 144 in FIG. 16, other embodiments of the invention may find application in a commercial point-of-sale (POS) environment, for example, in a consumer/retail or in a business-to-business warehouse environment. In these embodiments, the user can establish communication with the upsell system by interacting with a device located at the commercial establishment. These devices could be located at a checkout counter, or distributed throughout the aisles of the establishment. As a non-limiting example, this embodiment of the invention could be deployed in a retail home improvement warehouse to ensure that the user has obtained all parts and equipment necessary to complete a given project, as well as recommending or offering other upsell transactions based on the user's interest in the given project. In this example, obtaining the second data element can include obtaining a list of items that the user has previously purchased, and the method can identify the upsell transaction by analyzing the list of previously purchased items. More specifically, the method can compare the list of items previously purchased by the user to a list of items related to item involved in the primary transaction, and identify which items the user needs for a project that he/she has not purchased before. The method can then identify which items the user needs to complete the project related to the primary transaction and offer those items as upsell transactions. This aspect of the method may be particularly advantageous for preventing the user from making duplicate purchases of the same item for different projects, as well as ensuring that the user need only make one trip to acquire all of the items necessary to complete a given project.

Additional embodiments of the method can include offering the upsell transaction via a paper receipt issued to the user after the user completes a purchase of goods and/or services. In these embodiments, the method can identify the upsell transaction by analyzing a geographic location of the user before offering the upsell transaction to the user, and can offer an upsell transaction related to a merchant near the user via the paper receipt issued to the user after the primary transaction is complete. In other embodiments, the method can identify the upsell transaction by analyzing the subject matter to which the primary transaction pertains, and can offer the user via the paper receipt an upsell transaction to another merchant for subject matter that may be related to the subject matter of the primary transaction. In any of these embodiments, the user may accept the offered upsell transaction by presenting the paper receipt in-person at a merchant establishment.

Various embodiments of the invention also include using the method to identify at least one application for a new financial account to be offered to the user as an upsell transaction (block 145 of FIG. 16). Illustrative types of new financial accounts might include new credit card accounts, new debit card accounts, credit lines, new loans of any type, insurance policies, or the like. If the subject matter of the primary transaction conducted with the user suggests that the user has an interest in a specific area, further embodiments of the invention can tailor the financial account offered as the upsell transaction accordingly. Also, if for whatever reason, the user's credit card fails to authorize as payment for the primary transaction, the method can offer an application for the new application as an upsell. For example, if the primary transaction pertains to home improvement, home renovation, purchase of new appliances, or the like, the method may offer as a new financial account a home equity credit line or a second mortgage product that may be of interest to the user in financing the primary transaction or other similar transactions. As another example, if the primary transaction pertains to memorabilia, souvenirs, or if the user otherwise manifests an interest in a specific area (sports, history, politics, schools, alumni associations, or the like), then the method may offer as an upsell transaction a financial account having a theme corresponding to, benefiting, or otherwise relating to that specific area. Non-limiting examples of these types of financial accounts include credit cards bearing sports team logos, endowments or trusts benefiting an academic institution or charity, offers to contribute to or join historical societies or historical preservation organizations, or the like.

Figure 17:
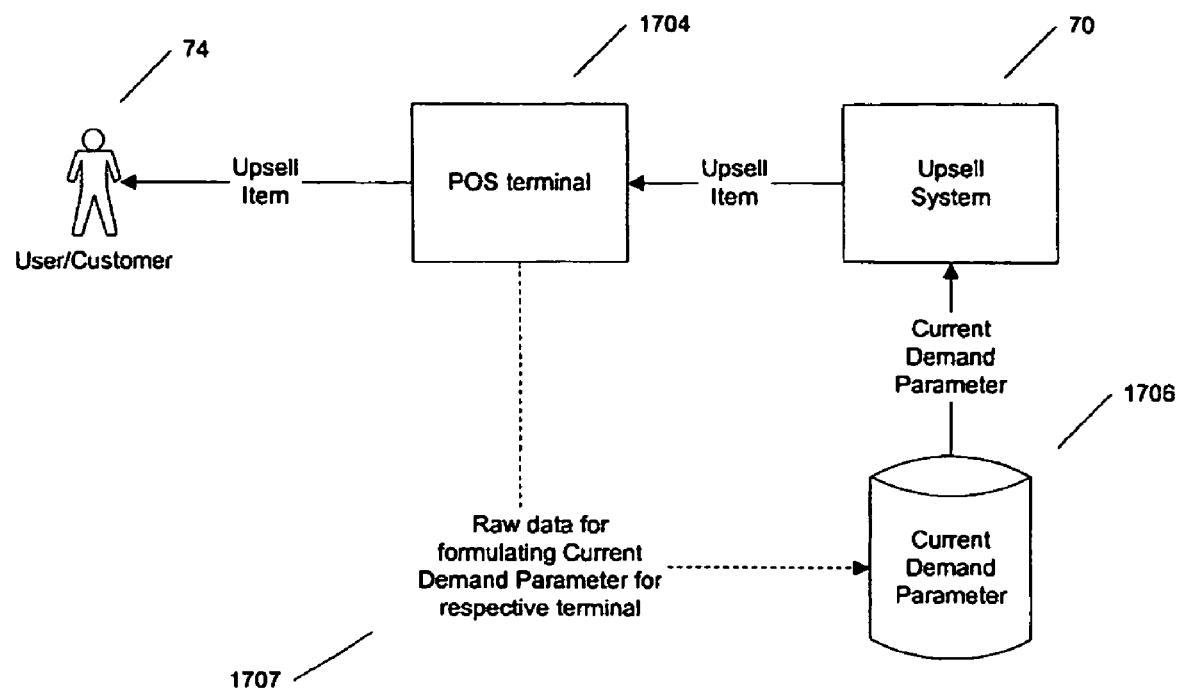
FIG. 17 is a block diagram illustrating components and data flows associated with further embodiments of the invention pertaining to selecting and offering upsell items of users interacting with a point of sale terminal.

Turning now to FIG. 17, other embodiments of the invention provide methods for offering upsell items to a user or customer 74 interacting with a point of sale (POS) terminal 1704. The POS terminal 1704 sends 1707 raw data for formulating current demand parameters for the POS terminal to a current demand parameter database 1706 which sends the current demand parameter to an upsell system 70. Based on the current demand parameter, the upsell system 70 sends information about an upsell item to the user or customer 74 via the POS terminal 1704.

Figure 17A:
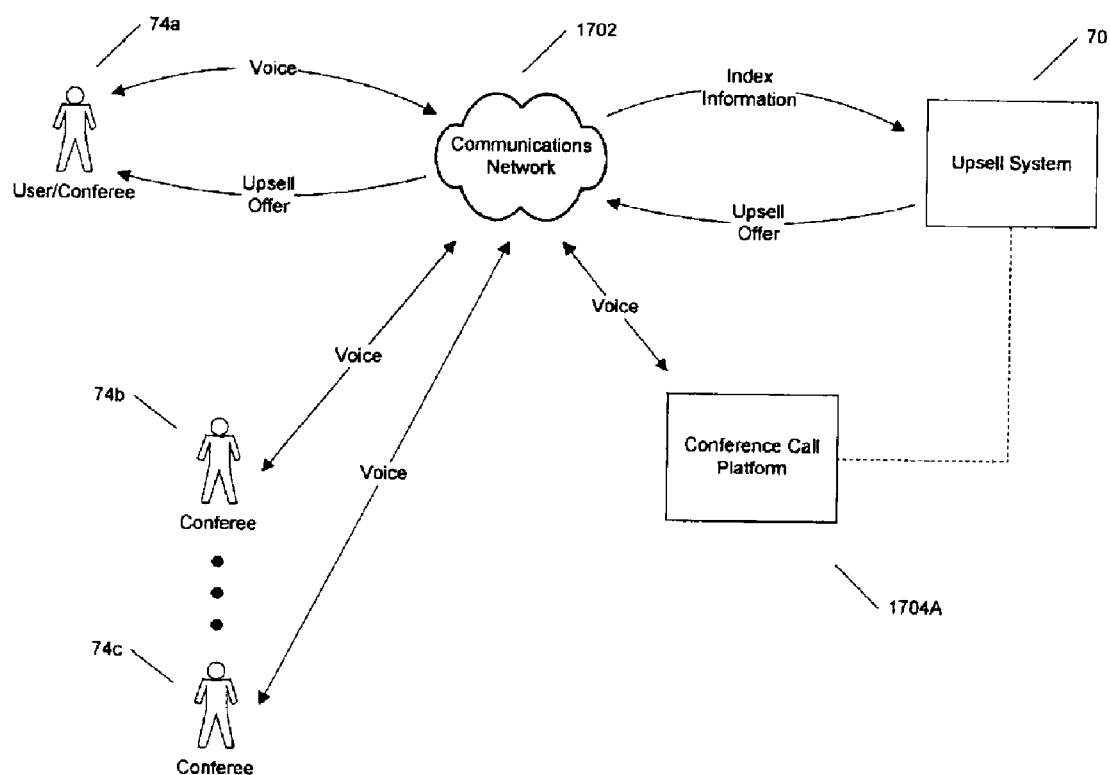
FIG. 17A is a block diagram illustrating components and data flows associated with further embodiments of the invention pertaining to selecting and offering upsell items of conferees participating in conference calls.

Turning now to FIG. 17A, further embodiments of the invention provide methods for offering upsell items to users 74 in the form of conferees 74a, 74b, and/or 74c, who may access a conferencing platform 1704A via communications network 1702 utilizing, for example, an electronic communications device (not shown in FIG. 17A). Various aspects of the methods can include conducting one or more conferee-initiated primary transactions related to accessing the conferencing platform 1704A. The method then obtains data relating to a given primary transaction, which data can represent the identity of the conferee 74a, the subject matter of the primary transaction, or other pertinent features of the primary transaction. The method then selects the upsell item as a result of, or in response to, the conferee-initiated primary transaction by utilizing the data representing the identity of the conferee 74a to obtain at least a second data element relating to the conferee 74a. The method then utilizes, at least in part, the data representing the subject matter of the primary transaction and the second data element, to determine the upsell item for offer to the conferee 74*a*. Finally, the upsell item is offered to the conferee 74*a* in real time with the primary transaction.

These further embodiments of the methods provide additional aspects of primary transactions. For example, a primary transaction may take the form of the conferee 74*a* dialing into a given conference call, or taking any other action to initial communication with other conferees 74*b* and 74*c* using a conference call platform 1704A in the form of a conference bridge or other equivalent technology. Other forms of a primary transaction can include a transaction whereby a conferee 74*a* recharges or replenishes a value parameter associated with a prepaid instrument used by the conferee 74*a* to pay for conferencing services. This replenishment transaction can occur before, during, or after a given conference call. For example, if a conferee 74*a* recognizes that the value stored in the instrument will or may expire before the end of an ongoing conference, he or she may initiate a recharge transaction during the conference to prevent the conference from being prematurely terminated. Alternatively, the conferee 74*a* may conduct this recharge transaction at a time in no particular temporal proximity to a given conference. In any event, the method as taught herein may execute on an upsell system 70 constructed and configured as taught elsewhere herein.

Turning to the conference or conference call in more detail, the conference or conference call can be either an ad hoc, impromptu, or otherwise "reservationless" call, or can be a pre-scheduled, reserved call, both of which are known in the art. Before an ad hoc call, the method may or may not have access to data representing a topic or subject matter to be discussed during the call, but if this information does become available before, during, or shortly after the call begins, it can serve as an input into the upsell determination unit to select upsell items to offer to one or more conferees 74. With a reserved call, it may be more likely that information representing a topic or subject matter of the call would be available as an input to the upsell system 70 before the call. For example, if a group of conferees 74 in the form of automotive enthusiasts conduct a given call (whether ad hoc or scheduled) to discuss an upcoming event, information or data indicating that the conferees 74 are enthusiasts may be provided to the upsell system 70. This information may be relevant in directing automotive-related upsell items to one or more of the conferees 74. This information may be captured and conveyed to the upsell system 70 using any number of means. For example, application software packages that support schedule-related functions (e.g., OUTLOOK® software available from Microsoft Corporation) may enable conferees 74 or other users to enter and store data representing topics for discussion in future conference calls. The upsell system 70 may be coupled to communicate with such software and receive any data representing topics of upcoming scheduled meetings or calls.

Turning briefly to definitional matters, those skilled in the art will recognize that the term "instrument" as used herein refers to any account, which may or may be have a tangible item (e.g., a card, or the like) associated or issued in connection therewith, that stores a value parameter that is decremented to pay for conferencing services. Those skilled in the art will further understand the term "conferee" 74 to refer to either a conference host or a conference participant as those terms are used in the industry, and more generally to refer to any person who is bridged to communicate with two or more other persons by voice. FIG. 17 shows three conferees 74*a*, 74*b*, and 74*c*, but the teachings herein may be extended to encompass any number of conferees 74. The term "conferencing platform" 1704A refers to any hardware and/or software components that support such bridging or such communication between conferees 74. Finally, the term "pre-paid" as used herein refers to a conferee 74 authorizing a payment from a first entity to a second entity, who in turn increases a store-value parameter indicating how much value the conferee 74 may thereafter expend on conferencing services. This store-value parameter is then decremented as agreed-to between the conferee 74 and the second entity as the former consumes conferencing services.

Further examples of the data related to the primary transaction can include ANI, DNIS, or other parameters discussed above, as known in the art and/or derived from telephonic communication network components. For example, a given conferencing services provider may assign a given conferee 74*a* a specific telephone number to dial to receive conferencing services, and when the DNIS service indicates this specific telephone number, the upsell system 70 may recognize that the given conferee 74*a* is calling. This recognition may in turn prompt the upsell system 70 to extract information related to the given conferee 74*a* from one or more data stores for use in selecting and recommending upsell items to offer the conferee 74*a*. Further examples of data related to the primary transaction can include any passwords, PINs, pass codes, or other codes (either spoken or keyed-in by the conferee 74*a*) while requesting or accessing conferencing services. Any of these types of data may serve to identify the conferee 74*a* and thus serve as at least one input to the upsell system 70.

Other forms of input data relating to the primary transaction can include account numbers or other identifying indicia associated with an instrument or account used by the conferee 74*a* to pay for conferencing services, for example, a pre-paid instrument. Also, a remaining value parameter or store value parameter associated with the instrument or account may serve as input indicating when the conferee 74*a* may exhaust the stored value and thus need to recharge the instrument, at which time the conferee 74*a* may be presented with upsell items that are selected as taught herein. Finally, in some embodiments of the invention, the conferee 74*a* may have a credit card or other financial account "linked" or otherwise configured to pay for conferencing services. In these embodiments, identifying indicia related to such credit card or financial account may serve as input to the upsell system 70, for example to identify the conferee 74*a*. In other embodiments, the conferee 74*a* may authorize a provider of conferencing services to debit a credit card or other such financial account to pay for conferencing services, and these debits may take the form of primary transactions, as that term is used herein.

In some of these further embodiments, the upsell item may be offered to the conferee 74*a* before the conference, for example while the conferee 74*a* is waiting on hold to join a given conference call, assuming time permits. In other embodiments, the upsell item may be offered during a conference, but may be directed to the conferee 74*a* via a device or medium other than the one used by the conferee 74*a* to join or participate in the conference. For example, the conferee 74*a* might use a mobile telephone to join and participate in the conference, but the selected upsell item may be offered to the conferee 74*a* via a voice mail directed to the mobile telephone or to a different telephone used by the conferee 74*a* (e.g., a stationary office telephone). Also, the selected upsell item could be offered via e-mail, instant message, or any other means or medium recognized as appropriate by those skilled in the art for implementing the teachings herein. Preferably, if the upsell item is to be offered to a conferee 74*a* during a conference, the upsell item is offered to the conferee 74*a* so as not unduly to distract the conferee 74*a* from participating in the conference.

These further embodiments of the method include offering the upsell item in real time with a transaction or operation by which the conferee 74*a* recharges or replenishes value associated with an instrument used to pay for conferencing services. In different aspects of these further embodiments, these replenishment transactions can occur before, during, or after a given conference, or can occur at times not proximate a given conference. As discussed above, these replenishment transactions can serve as "primary transactions" as that term is used herein, and as such can serve as a trigger to cause offers of upsell transactions that are selected and offered as disclosed herein.

Those skilled in the art will recognize that the description of FIG. 17 is to be considered in addition to the teaching elsewhere herein. More specifically, the inputs and processing described in connection with FIG. 17 can be combined with the other teachings herein to select and offer upsell items.

The invention also provides a program storage device 129 (see FIG. 13) readable by a computer or other machine, embodying a program of instructions executable by the machine to perform the various aspects of the method as discussed and claimed herein, and as illustrated in the Figures, for performing the various functional aspects of the method as set forth herein. Generally speaking, the program storage device 129 can be implemented using any technology based upon materials having specific magnetic, optical, or semiconductor properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 129 can be affixed permanently or removably to a bay, socket, connector, or other hardware provided by the cabinet, motherboard, or other component of a given computer system.

For the purpose of conciseness, and in the interest of avoiding undue duplication of elements in the drawings, only FIG. 13 shows the program storage device 129. However, those skilled in the art will recognize that an application program stored on program storage device 129 could implement all functionality illustrated in any of the drawings or discussed anywhere in the description.

Those skilled in the art will also understand that a computer programmed in accordance with the above teaching using known programming languages provides means for realizing the various functions, methods, and processes as described and claimed herein and as illustrated in the drawing figures attached hereto. This application program can implement the various aspects of the method discussed above and shown in the drawing figures, and can be coded using any suitable programming or scripting language. However, it is to be understood that the invention as described herein is not dependent on any particular operating system, environment, or programming language. Example operating systems include, without limitation, LINUX, UNIX, or any of the Windows™-family of operating systems, and example languages include without limitation a variety of structured and object-oriented languages such as C, C++, Visual Basic, Java, Perl, or the like.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A method for providing offers in real time of an item constituting a good or a service in the form of offers for purchase of the item to prospective customers as users of the system, utilizing an electronic communications device, comprising the steps of:

establishing a communication via the electronic communications device between the user and the system for purpose of a user initiated primary transaction for purchase of a specific good or service, wherein the system is a conferencing platform, obtaining primary transaction data with respect to the primary transaction, including the identity of the prospective customer and of the good or service for purchase in the primary transaction, generating an upsell offer as a result of the user initiated primary transaction by:

utilizing the identity of the prospective customer to obtain at least a second data element relating to the user, utilizing at least in part the primary transaction data including the identity of the good or service of the primary transaction and the second data element and determining at least one item for a prospective upsell transaction with the prospective customer, and offering the item to the prospective customer and receiving an acceptance of the offer from at least one user in real time during the course of the user initiated communication.

2. A system for providing offers in real time of an item constituting a good or a service in the form of offers for purchase of the item to prospective customers as users of the system, utilizing an electronic communications device, comprising:

an interface for establishing a user initiated communication via the electronic communications device between the user and the system for purpose of a primary transaction for purchase of a specific good or service, wherein the system is a conferencing platform that supports conference calls, and wherein the user is a conferee, an input collection system for obtaining primary transaction data with respect to the primary transaction, including an identification data unit to obtain the identity of the prospective customer and of the good or service for purchase in the primary transaction, a data access system utilizing the identity of the prospective customer to obtain at least a second data element relating to the user, an upsell determining unit responsive to the user initiated primary transaction utilizing at least in part the primary transaction data including the identity of the good or service of the primary transaction and the second data element for determining at least one item for a prospective upsell transaction with the prospective customer, and a communication system for offering the item to the prospective customer in real time during the course of the user initiated communication and receiving an acceptance of the offer from at least one user.

3. A method for providing offers and receiving acceptances in real time to effect a transaction regarding an item constituting a good or a service between prospective customers as users of the system and the system, utilizing an electronic communications device, including a computer, comprising the steps of:

establishing communication via the Internet between the user's computer and the system for purpose of a primary transaction comprising an Internet purchase transaction, wherein the system is a conferencing platform that supports conference calls, and wherein the user is a conferee, obtaining primary transaction data with respect to the transaction, including the identity of the prospective customer, obtaining at least a second data element relating to the user, utilizing at least in part the primary transaction data and the second data element in determining at least one good or service item for prospective upsell to the prospective customer, displaying from the system via the Internet an image of the item to the prospective customer on the user's computer in real time during the course of the communication, and receiving an acceptance of the offer from at least one user via the Internet to the system to consummate the transaction.

* * * * *